US012651770B2

(12) United States Patent
Matsumoto et al.

(10) Patent No.: US 12,651,770 B2
(45) Date of Patent: Jun. 9, 2026

(54) POLYMER SOLID ELECTROLYTE, METHOD FOR PRODUCING SAME, AND ELECTROCHEMICAL DEVICE

(71) Applicant: MURATA MANUFACTURING CO., LTD., Kyoto (JP)

(72) Inventors: Ryuhei Matsumoto, Kyoto (JP); Yuri Nakayama, Kyoto (JP); Hideki Kawasaki, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 622 days.

(21) Appl. No.: 18/176,006

(22) Filed: Feb. 28, 2023

(65) Prior Publication Data

US 2023/0291009 A1 Sep. 14, 2023

Related U.S. Application Data

(63) Continuation of application No. PCT/JP2021/016794, filed on Apr. 27, 2021.

(30) Foreign Application Priority Data

Aug. 28, 2020 (JP) ................................ 2020-144622

(51) Int. Cl.
*H01M 10/0565* (2010.01)
*H01M 4/38* (2006.01)
(Continued)

(52) U.S. Cl.
CPC ....... *H01M 10/0565* (2013.01); *H01M 4/381* (2013.01); *H01M 10/054* (2013.01);
(Continued)

(58) Field of Classification Search
CPC .... H01M 4/362; H01M 50/434; H01M 4/382; H01M 50/46; H01M 10/0568;
(Continued)

(56) References Cited

U.S. PATENT DOCUMENTS

2016/0197375 A1 7/2016 Carlson et al.
2018/0010256 A1 1/2018 Willit et al.
(Continued)

FOREIGN PATENT DOCUMENTS

CN 101466750 6/2009
CN 110828892 A * 2/2020 .......... H01M 10/054
(Continued)

OTHER PUBLICATIONS

Cui et al., A Solid Magnesium-sulphur Battery, Preparation Method and Application in Deep Sea, Feb. 2020, See the Abstract. (Year: 2020).*

(Continued)

*Primary Examiner* — Tiffany Legette
*Assistant Examiner* — Monique M Wills
(74) *Attorney, Agent, or Firm* — K&L Gates LLP

(57) ABSTRACT

A polymer solid electrolyte for an electrochemical device including a magnesium electrode as a negative electrode,
the polymer solid electrolyte including a Mg polymer salt containing $Mg^{2+}$ and an anionic polymer having an anionic functional group and a coordinating functional group, and
the polymer solid electrolyte having Mg ion conductivity.

3 Claims, 10 Drawing Sheets

(51) Int. Cl.
*H01M 10/054* (2010.01)
*H01M 4/02* (2006.01)

(52) U.S. Cl.
CPC ................. *H01M 2004/027* (2013.01); *H01M 2004/028* (2013.01); *H01M 2300/0082* (2013.01)

(58) Field of Classification Search
CPC ............. H01M 4/525; H01M 10/0565; H01M 10/054; H01M 4/381
See application file for complete search history.

(56) References Cited

U.S. PATENT DOCUMENTS

| | | | |
|---|---|---|---|
| 2018/0015917 A1 | 1/2018 | Itagaki et al. | |
| 2021/0135290 A1* | 5/2021 | Lee | C08F 112/20 |

FOREIGN PATENT DOCUMENTS

| | | |
|---|---|---|
| CN | 115038738 | 9/2022 |
| JP | 2000003619 A | 1/2000 |
| JP | 2018030959 A | 3/2018 |
| JP | 2019157008 A | 9/2019 |
| WO | 2021146815 | 7/2021 |

OTHER PUBLICATIONS

Japanese Office Action issued Feb. 27, 20024 in corresponding Japanese Application No. 2022-545302.

Chinese Office Action issued Dec. 26, 2023 in corresponding Chinese Application No. 202180053332.4.

International Search Report of corresponding PCT application PCT/JP2021/016794, dated Jul. 13, 2021.

* cited by examiner (5-2)

(4-2)

(a)

(b)

POLYMER SOLID ELECTROLYTE, METHOD FOR PRODUCING SAME, AND ELECTROCHEMICAL DEVICE

CROSS REFERENCE RELATED TO APPLICATIONS

The present application is a continuation of PCT patent application no. PCT/JP2021/016794, filed on Apr. 27, 2021, which claims priority to Japanese patent application no. JP2020-144622, filed Aug. 28, 2020, the entire contents of which are herein incorporated by reference.

BACKGROUND

The present application relates to a polymer solid electrolyte, a method for fabricating the same, and an electrochemical device.

Electrochemical devices include capacitors, air batteries, fuel cells, secondary batteries, and the like, and are used for various purposes. Such an electrochemical device includes a positive electrode and a negative electrode, and contains a solid electrolyte responsible for ion transport between the positive electrode and the negative electrode.

For example, an electrochemical device represented by a magnesium battery includes, as an electrode, an electrode made from magnesium or an electrode containing at least magnesium (hereinafter, such an electrode is also simply referred to as a "magnesium electrode", and the electrochemical device including the magnesium electrode is also referred to as a "magnesium electrode-based electrochemical device"). Magnesium is a more abundant resource and cheaper than lithium. In addition, magnesium generally has a large amount of electricity per unit volume that can be extracted by a redox reaction, and is highly safe when used in an electrochemical device. Therefore, the magnesium battery draws attention as a next-generation secondary battery replacing lithium-ion batteries.

SUMMARY

The present application relates to a polymer solid electrolyte, a method for fabricating the same, and an electrochemical device.

As a solid electrolyte of a magnesium battery, it has been proposed to use an inorganic substance. For example, an inorganic substance having a composition represented by the general formula: $Mg_xM_ySiO_z$, wherein M is at least one element selected from the group consisting of Ti, Zr, Hf, Ca, Sr, and Ba, $0<x<2$, $0<y<2$, and $3<z<6$, is used. Further, for example, an inorganic substance having a composition represented by the general formula: $Mg_xSiO_yN_z$, wherein $1<x<2$, $3<y<5$ and $0\leq z<1$, is used.

Since inorganic substances have low flexibility, there was a disadvantage that in the case that an inorganic substance is used as a solid electrolyte, when a stress is applied to the solid electrolyte or when a stress is generated in the solid electrolyte, the solid electrolyte is brittle and hardly returns to its original shape. In addition, the ion conductance of solid electrolytes composed of inorganic substances is extremely low in the order of $10^{-9}$ to $10^{-7}$ S/cm at 500° C.

The present application has been devised in view of such problems. In an embodiment, the present application relates to providing In an embodiment, the present application relates to providing a solid electrolyte which has superior structure maintainability and contributes to realization of an electrochemical device having higher ion conductivity than the conventional one.

The present application, in an embodiment, provides a polymer solid electrolyte for an electrochemical device including a magnesium electrode as a negative electrode, the polymer solid electrolyte including a Mg polymer salt containing $Mg^{2+}$ and an anionic polymer having an anionic functional group and a coordinating functional group, and the polymer solid electrolyte having Mg ion conductivity.

The present application provides, in an embodiment, a method for producing a polymer solid electrolyte having Mg ion conductivity, the method including:

a step of dissolving a Li polymer salt represented by general formula (4):

[Chemical Formula 1]

(4)

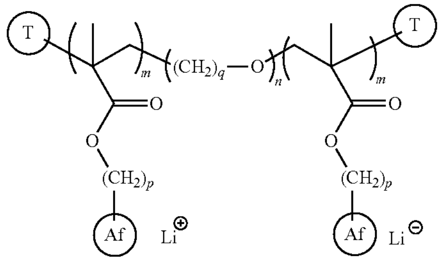

in the general formula (4), Af represents an anionic functional group, T represents a terminal group, m represents an integer of 3 to 40, n represents an integer of 150 to 850, p and q each represent an integer of 1 to 10, and p and q may be same or different from each other, in a linear ether solution of a Mg salt, and adding a linear ether to precipitate a Mg polymer salt represented by general formula (5):

[Chemical Formula 2]

(5)

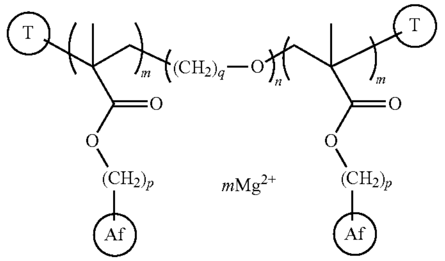

in the general formula (5), Af represents an anionic functional group, T represents a terminal group, m represents an integer of 3 to 40, n represents an integer of 150 to 850, p and q each represent an integer of 1 to 10, and p and q may be same or different from each other.

The polymer solid electrolyte of the present application, in an embodiment, affords an electrochemical device having superior structure maintainability and high ion conductivity. For example, in a magnesium electrode-based electrochemical device in which the polymer solid electrolyte of the present application is used, the polymer solid electrolyte contains a Mg polymer salt containing $Mg^{2+}$ and an anionic polymer having an anionic functional group and a coordinating functional group. Due to such a configuration of the polymer solid electrolyte, the polymer solid electrolyte has high ion conductivity (Mg ion conductivity).

The electrolyte of the magnesium electrode-based electrochemical device of the present application is composed of a Mg polymer salt according to an embodiment. Therefore, also when a stress is applied to the solid electrolyte or also when a stress is generated in the solid electrolyte, the Mg polymer salt can be restored to its original shape due to its high flexibility. The polymer solid electrolyte is superior in structure maintainability due to such a configuration.

In addition, in the method for producing a polymer solid electrolyte of the present application, a polymer solid electrolyte that affords an electrochemical device having superior structure maintainability and high ion conductivity is produced according to an embodiment. In the method for producing a polymer solid electrolyte, a Li polymer salt is dissolved in a linear ether solution of a Mg salt and a linear ether is added to precipitate a Mg polymer salt, in other words, $L^+$ of the Li polymer salt is replaced by $Mg^{2+}$ through an ion exchange reaction and thus a polymer is precipitated to afford a Mg polymer salt. Therefore, the Mg polymer salt obtained has a relatively high Mg ion concentration. Furthermore, since an anionic polymer has a structure represented by the general formula (5) and forms an ionic bond with moderate strength especially with $Mg^{2+}$, the Mg polymer salt can contribute to high ionic conductivity.

The effect described in the present description is merely an example and is not restrictive, and an additional effect may be provided.

DETAILED DESCRIPTION

Figure 1:
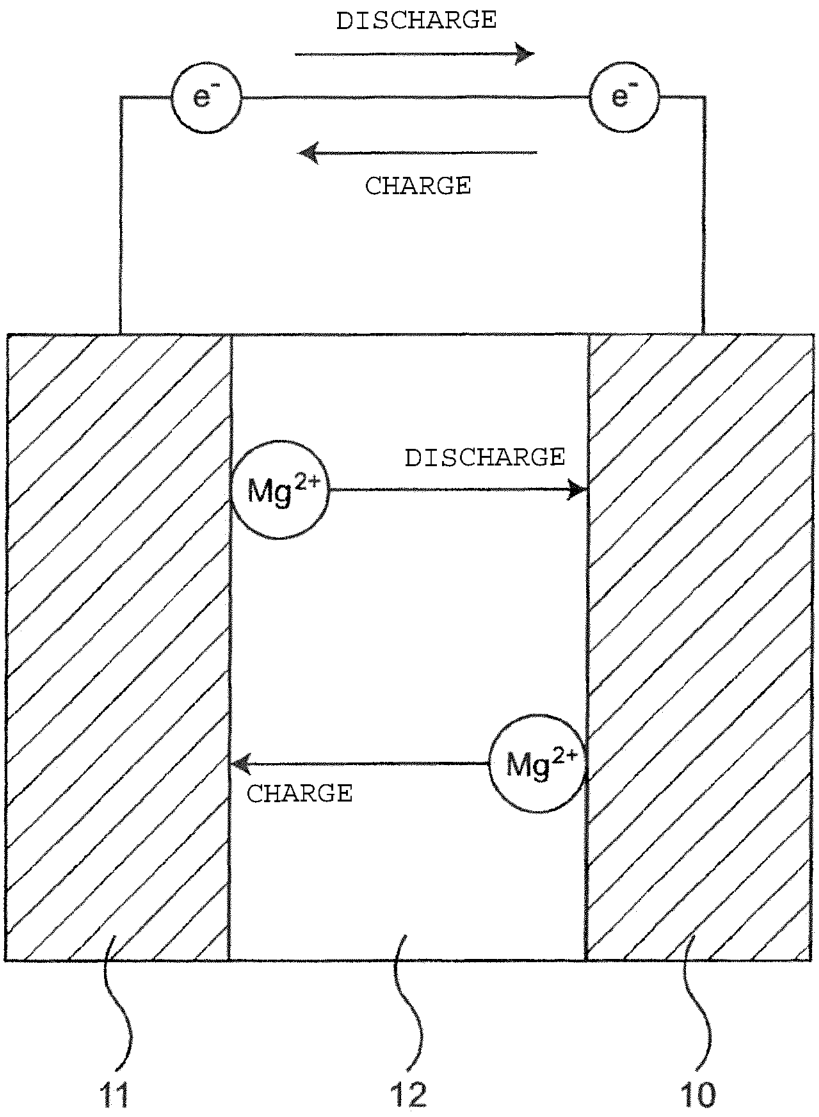
FIG. 1 is a conceptual diagram of a magnesium electrode-based electrochemical device (particularly a battery) according to an embodiment of the present application.

Hereinafter, "the polymer solid electrolyte for electrochemical devices (hereinafter, a polymer solid electrolyte is also referred to as a solid electrolyte) and method for producing the same" and "the electrochemical device" of the present application will be described in further detail below according to an embodiment. While the description is made with reference to the drawings as necessary, the contents shown in the drawings are only schematically and illustratively shown for understanding the present application, and the appearance, the dimensional ratio, and the like can be different from the actual ones. Various numerical ranges referred to in the present description are intended to include the values of the upper limit and the lower limit. That is, when there is, for example, a numerical range of 1 to 10, the lower limit value "1" and the upper limit value "10" are interpreted to be included unless otherwise specified.

In the present application, the term "electrochemical device" broadly means a device capable of extracting energy by utilizing electrochemical reactions. The "electrochemical device" narrowly means a device including a pair of electrodes and an electrolyte, particularly a device that charges and discharges along with movement of ions. Although only an example, examples of the electrochemical device include a capacitor, an air battery, a fuel cell, and the like, in addition to a secondary battery.

The solid electrolyte of the present application is used for an electrochemical device. That is, the solid electrolyte described in the present description corresponds to an electrolyte for a device capable of extracting energy by utilizing an electrochemical reaction.

The solid electrolyte according to the present application is a solid electrolyte presupposed to be used in an electrochemical device including a magnesium electrode. Particularly, the solid electrolyte according to the present application is a solid electrolyte for an electrochemical device including the magnesium electrode as a negative electrode. Therefore, the solid electrolyte of the present application can be said to be a solid electrolyte for a magnesium electrode-based electrochemical device (hereinafter, also simply referred to as a "magnesium electrode-based solid electrolyte").

As described later, this electrochemical device including the magnesium electrode as the negative electrode preferably includes a sulfur electrode as a positive electrode. That is, in a preferred embodiment, the solid electrolyte is a solid electrolyte for magnesium (Mg)-sulfur (S) electrode.

Here, the term "magnesium electrode" used in the present description broadly refers to an electrode having magnesium (Mg) as an active ingredient (that is, an active material). In a narrow sense, the term "magnesium electrode" refers to an electrode containing magnesium, for example, an electrode containing a magnesium metal or a magnesium alloy, particularly a negative electrode of such magnesium. Although the magnesium electrode may contain a component other than a magnesium metal or magnesium alloy, in a preferred embodiment, the magnesium electrode is an electrode made of a metal body of magnesium (for example, an electrode made of a single magnesium metal having a purity of 90% or more, preferably a purity of 95% or more, more preferably, a purity of 98% or more).

The term "sulfur electrode" used in the present description broadly refers to an electrode having sulfur (S) as an active ingredient (that is, an active material). In a narrow sense, the term "sulfur electrode" refers to an electrode that contains at least sulfur, to an electrode that contains sulfur (S), such as $S_8$ and/or polymeric sulfur, and especially to a positive electrode of such sulfur. The sulfur electrode may contain components other than sulfur, and may contain, for example, a conductive auxiliary agent and a binder. Although it is merely an example, a sulfur content in the sulfur electrode may be 5% by mass or more and 95% by mass or less based on the entire electrode, and may be, for example, about 70% by mass or more and about 90% by mass or less (in an exemplary embodiment, the sulfur content in the sulfur electrode may be 5% to 20% by weight or 5% to 15% by weight, for example).

The magnesium electrode-based solid electrolyte according to the present application has Mg ion conductivity. The ion conductance of the solid electrolyte is, for example, a value on the order of $10^{-5}$ S/cm at 50° C. The method of measuring the ion conductance will be described in detail in the section of EXAMPLES. In conventional solid electrolytes composed of an inorganic substance, Mg ion conductance has a value on the order of $10^{-9}$ to $10^{-7}$ S/cm at a considerably high temperature. For example, in Patent Documents 1 and 2, the Mg ion conductance is $1.1\times10^{-9}$ to about $3.6\times10^{-7}$ S/cm at 500° C.

The solid electrolyte contains a Mg polymer salt. Since the solid electrolyte contains the Mg polymer salt, also when a stress is applied to the solid electrolyte or when a stress is generated in the solid electrolyte, the Mg polymer salt can return to its original shape due to its high flexibility. Therefore, the solid electrolyte is superior in structure maintainability.

In addition, the solid electrolyte is a solid and is not a liquid (electrolytic solution). Since the solid electrolyte contains no organic solvent, there is no possibility that an electrolytic solution leaks from an electric device, and the solid electrolyte is superior in safety and operability. Furthermore, since the solid electrolyte contains no organic solvent, the solid electrolyte is superior in thermal stability. The reason why the solid electrolyte does not contain an organic solvent as a dispersion medium is that coordinating functional groups of an anionic polymer disperse $Mg^{2+}$ in the solid electrolyte as described later.

The Mg polymer salt contains $Mg^{2+}$ and an anionic polymer having an anionic functional group and a coordinating functional group. Due to such a configuration of the solid electrolyte, the solid electrolyte has high ion conductivity. Although not bound by a specific theory, the reason is presumed as follows. Coordinating functional groups disperse $Mg^{2+}$ in the solid electrolyte. The anionic polymer has a certain degree of intramolecular mobility in the solid electrolyte, and for example, the molecular chain of the anionic polymer having anionic functional groups moves. Since an anionic functional group (for example, a monovalent negatively charged functional group) acts electrostatic attraction between the anionic functional group and the counter ion $Mg^{2+}$, $Mg^{2+}$ can be transported in the solid electrolyte in association with the movement of anionic functional groups. As described above, since the anionic polymer efficiently transports $Mg^{2+}$ as a carrier in the solid electrolyte, the ionic transference number of $Mg^{2+}$ is increased and the Mg ion conductivity of the solid electrolyte is high.

The Mg polymer salt may be, for example, a triblock copolymer (an ABA type triblock copolymer) represented by general formula (1):

[Chemical Formula 3]

(A)-(B)-(A) (1)

in the general formula (1), (A) represents a block having an anionic functional group, (B) represents a block having a coordinating functional group, and the two (A)s may be the same or different from each other.

In the general formula (1), (A) may be a block represented by general formula (2):

[Chemical Formula 4]

(2)

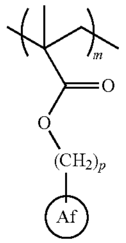

in the general formula (2), Af represents an anionic functional group, m represents an integer of 3 to 40, and p represents an integer of 1 to 10.

In the general formula (2), from the viewpoint of further improving the Mg ion conductivity, p preferably represents 3 and m preferably represents 20 to 40.

In the general formula (2), examples of the alkylene group $—(CH_2)_p—$ include a methylene group, an ethylene group, a n-propylene group, a n-butylene group, a n-pentylene group, a n-hexylene group, a n-heptylene group, a n-octylene group, a n-nonylene group, and a n-decylene group. In the m repeating units represented by the general formula (2), the m alkylene groups may be the same or different from each other. Among these alkylene groups, a n-propylene group is preferable from the viewpoint of improving Mg ion conductivity.

The valence of the anionic functional group may be monovalent or polyvalent (for example, divalent). The anionic functional group is preferably a monovalent anionic functional group. In this case, the Mg ion conductivity is further improved. Although not bound by a specific theory, the reason is presumed as follows. The anionic functional group causes an electrostatic attractive force to act between the anionic functional group and a counter ion $Mg^{2+}$ in the solid electrolyte to form an ionic bond. Here, the monovalent anionic functional group forms a relatively weak ionic bond with $Mg^{2+}$ because of its smaller valence than divalent or higher multivalent anionic functional groups. For this reason, the monovalent anionic functional group forms an ionic bond with appropriate strength with $Mg^{2+}$, and the binding of $Mg^{2+}$ as a carrier is controlled. Therefore, it is considered that the ionic transference number of $Mg^{2+}$ is increased and the Mg ion conductivity is further improved.

As the anionic functional group, a perfluoroalkylsulfonylamide group ($C_kF2_{k+1}—SO_2—N_—SO_2—$ group; k represents an integer of 1 to 10) and an $—SO_3^-$ group are more preferable, a perfluoroalkylsulfonylamide group is still more preferable, and a trifluoromethylsulfonylamide group ($CF_3—SO_2—N_—SO_2—$ group) is particularly preferable. The m anionic functional groups in the m repeating units represented by the general formula (2) may be the same as or different from each other.

The perfluoroalkylsulfonylamide group and the $—SO_3^-$ group have a relatively large spatial extent of a negative charge. Therefore, when the anionic functional group is a perfluoroalkylsulfonylamide group or an $—SO_3^-$ group, the anionic functional group forms an ionic bond having a moderate strength with $Mg^{2+}$, and the electrostatic attraction between $Mg^{2+}$ and the anionic functional group acts moderately to such an extent that $Mg^{2+}$ is not strongly bound to the anionic functional group. As described above, it is considered that since the binding of $Mg^{2+}$ by the anionic functional group is controlled, the ionic transference number of $Mg^{2+}$ is increased and the Mg ion conductivity is further improved.

The anionic polymer preferably has an anionic functional group in a side chain, for example, as represented by the general formula (2). In this case, the Mg ion conductivity of the solid electrolyte is further enhanced. Although not bound by a specific theory, the reason is presumed as follows. A side chain of the anionic polymer has a higher degree of freedom of movement than the main chain, so that the anionic polymer moves in the solid electrolyte, for example, so as to swing side chains. Since electrostatic attraction acts between anionic functional groups and $Mg^{2+}$, $Mg^{2+}$ can also move with the movement of the side chains of the anionic polymer. Therefore, it is considered that when the anionic polymer has anionic functional groups in side chains, the ionic transference number of $Mg^{2+}$ is further increased and the Mg ion conductivity of the solid electrolyte is further enhanced.

In the general formula (1), (B) may be a block represented by general formula (3):

[Chemical Formula 5]

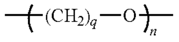

(3)

in the general formula (3), n represents an integer of 150 to 850, and q represents an integer of 1 to 10.

In the general formula (3), q preferably represents 2 from the viewpoint of further improving the Mg ion conductivity.

The block represented by the general formula (3) is a poly(alkylene oxide) in which a plurality of alkyleneoxy structural units are linearly bonded. Here, the "alkyleneoxy structural unit" refers to a molecular structural unit in which an alkylene group is bonded to an oxygen atom ($—(CH_2)_q—O—$) (q in the molecular structural unit has the same meaning as q in the general formula (3)).

The poly(alkylene oxide) represented by the general formula (3) is, for example, a poly(alkylene oxide) having 1 to 10 carbon atoms. Examples of the poly(alkylene oxide) include poly(methylene oxide), poly(ethylene oxide), poly(n-propylene oxide), poly(n-butylene oxide), poly(n-pentylene oxide), poly(n-hexylene oxide), poly(n-heptylene oxide), poly(n-heptylene oxide), poly(n-octylene oxide), poly(n-nonylene oxide), and poly(n-decylene oxide). Among these poly(alkylene oxide)s, poly(ethylene oxide) is preferable from the viewpoint of further improving the Mg ion conductivity.

The plurality of alkylene oxide structural units contained in the block represented by the general formula (3) are, for example, a plurality of alkylene oxide structural units having 1 to 10 carbon atoms. Examples of the alkyleneoxy in this structural unit include methyleneoxy, ethyleneoxy, n-propyleneoxy, n-butyleneoxy, n-pentyleneoxy, n-hexyleneoxy, n-heptyleneoxy, n-octyleneoxy, n-nonyleneoxy, and n-decyleneoxy. Among these alkyleneoxy, ethyleneoxy is preferable from the viewpoint of further improving the Mg ion conductivity.

The anionic polymer preferably has a coordinating functional group in the main chain, for example, as represented by the general formula (3). In this case, the Mg ion conductivity is further improved. Although not bound by a specific theory, the reason is presumed as follows. Since a coordinating functional group has a relatively flexible structure, when an anionic polymer has a coordinating functional group in the main chain, the anionic polymer has an increased degree of freedom of movement. Since electrostatic attraction acts between anionic functional groups and $Mg^{2+}$, $Mg^{2+}$ can also move with the movement of the main chain of the anionic polymer. Therefore, it is considered that when the anionic polymer has a coordinating functional group in the main chain, the ionic transference number of $Mg^{2+}$ is increased and the Mg ion conductivity is further improved.

For example, as represented by the general formula (3), the coordinating functional group is preferably poly(alkylene oxide), and more preferably poly(ethylene oxide) (this is the polyalkylene oxide specified when q represents 2 in the general formula (3)). In this case, the Mg ion conductivity is further improved. Although not bound by a specific theory, the reason is presumed as follows. Since poly(ethylene oxide) has a relatively flexible structure, when an anionic polymer has poly(ethylene oxide) as a coordinating functional group, the anionic polymer has an increased degree of freedom of movement. Furthermore, unshared electron pairs of the oxygen atoms of the polyalkylene oxide are easily coordinated to $Mg^{2+}$, the dispersibility of $Mg^{2+}$ in the solid electrolyte is further improved. As a result, it is considered that the ionic transference number of $Mg^{2+}$ is increased and the Mg ion conductivity is further improved.

The Mg polymer salt represented by the general formula (1) may be, for example, a Mg polymer salt represented by the general formula (5):

[Chemical Formula 6]

(5)

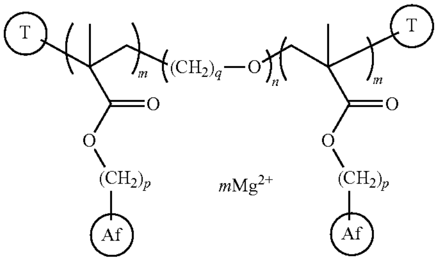

in the general formula (5), Af represents an anionic functional group, T represents a terminal group, m represents an integer of 3 to 40, n represents an integer of 150 to 850, p and q each represent an integer of 1 to 10, and p and q may be the same or different from each other (hereinafter, the Mg polymer salt represented by the general formula (5) is also referred to as "Mg polymer salt (5)").

It is noted that m, p and Af, and n and q in the general formula (5) have the same meanings as m, p and Af in the general formula (2), and n and q in the general formula (3), respectively. T in the general formula (5) may be, for example, $C_6H_5C(=S)S-$. Af in the general formula (5) represents a monovalent anionic functional group.

The number average molecular weight Mn of the Mg polymer salt is, for example, 12,000 to 60,000. A method for measuring the number average molecular weight of the Mg polymer salt will be described in detail in Examples.

Examples of the Mg polymer salt (5) include a Mg polymer salt represented by the general formula (5-2):

[Chemical Formula 7]

(5-2)

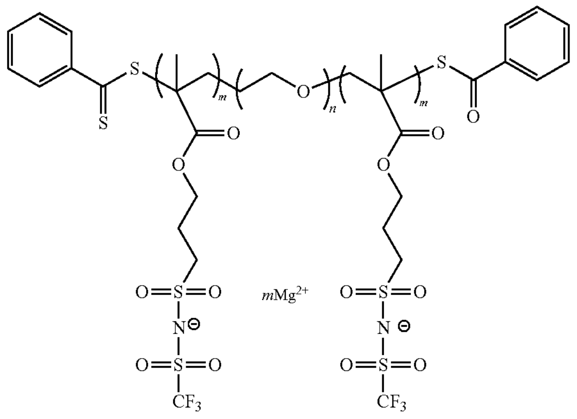

in the general formula (5-2), m represents an integer of 3 to 40, and n represents an integer of 150 to 850 (hereinafter also referred to as "Mg polymer salt (5-2)").

The solid electrolyte may be composed of a Mg polymer salt.

The magnesium electrode-based solid electrolyte according to the present application is suitable for the electrochemical device including a magnesium electrode as a negative electrode and is further suitable when the device includes a sulfur electrode as a positive electrode. That is, the solid electrolyte according to the present application is a solid electrolyte for the electrochemical device including a magnesium electrode as a negative electrode, and the electrochemical device preferably includes a sulfur electrode as a positive electrode. An electrochemical device including such a magnesium electrode-sulfur electrode pair is hereinafter also to as "magnesium-sulfur electrode-based electrochemical device".

As one example of a method for producing the solid electrolyte of the present application, a method for synthesizing the Mg polymer salt (5) will be described according to an embodiment. The method for synthesizing the Mg polymer salt (5) includes a Li polymer salt synthesis step and an ion exchange step. That is, the Mg polymer salt (5) is synthesized in accordance with the reactions (R-1) to (R-2) or by a method equivalent thereto as shown in the following reaction scheme.

[Chemical Formula 8]

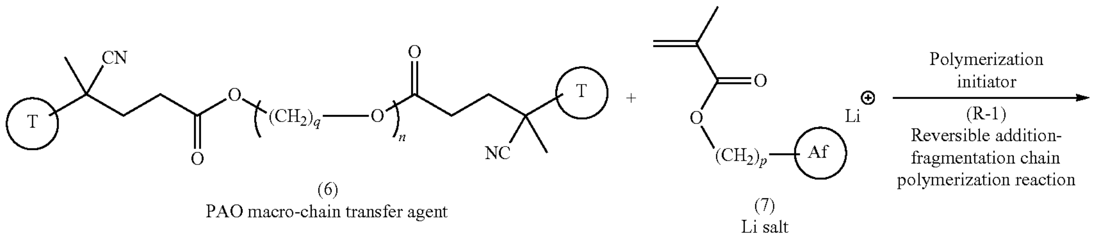

(6)
PAO macro-chain transfer agent (7)
Li salt

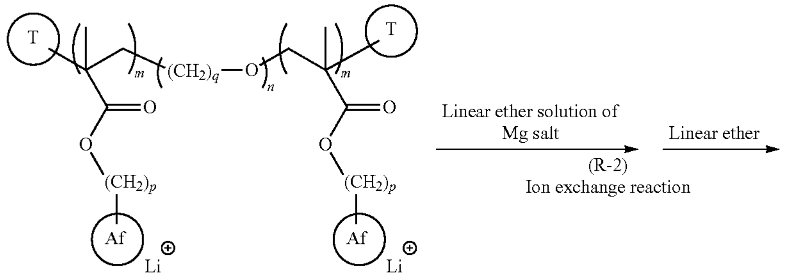

(4)
Li polymer salt

-continued

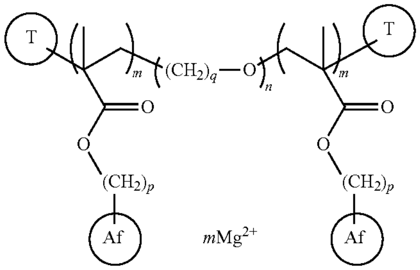

(5)

Mg polymer salt

In the Li polymer salt synthesis step, a PAO macro-chain transfer agent represented by general formula (6) (hereinafter also referred to as PAO macro-chain transfer agent (6)) and a Li salt of a methacrylic acid derivative represented by the general formula (7) (hereinafter also referred to as Li salt (7)) are subjected to a reversible addition-fragmentation chain polymerization reaction (RAFT reaction: reaction (R-1)) in the presence of a polymerization initiator, and thus a Li polymer salt represented by the general formula (4) (hereinafter also referred to as Li polymer salt (4)) is synthesized.

In the reaction (R-1), q and n in the general formula (6) and p and Af in the general formula (7) have the same meanings as q, n, p and Af in the general formula (5), respectively. m, n, p, q and Af in the general formula (4) have the same meanings as m, n, p, q and Af in the general formula (5), respectively. In the above reaction scheme, Af in the general formula (5) represents a monovalent anionic functional group.

Examples of the polymerization initiator include azo-type polymerization initiators (more specifically, 2,2'-azobis(2-aminopropane) hydrochloride (AIBA)). The polymerization initiator may be added, for example, in an amount of 0.1 to 0.4 mol per mol of the PAO macro-chain transfer agent.

In the reaction (R-1), for example, m moles of the Li salt (7) are reacted with 1 mole of the PAO macro-chain transfer agent to afford 1 mole of the Li polymer salt (4). In the reaction (R-1), the reaction temperature is preferably 40° C. or higher and 80° C. or lower. The reaction time is preferably 8 hours or more and 15 hours or less.

The PAO macro-chain transfer agent (6) and the Li salt (7), which are the starting compounds in the reaction (R-1), may be prepared by synthesis.

In the ion exchange step, the Li polymer salt (4) is subjected to an ion exchange reaction to afford a Mg polymer salt (5). The Li polymer salt (4) is dissolved in a linear ether solution of a Mg salt (Mg electrolytic solution). Examples of the Mg salt include magnesium chloride ($MgCl_2$), Mg salts of perfluoroalkylsulfonylimide (more specifically, a Mg salt of trifluoromethylsulfonylimide (magnesium bistrifluoromethanesulfonylimide: $Mg(TFSI)_2$)), and mixtures thereof. The concentration of the Mg salt is, for example, 0.5 to 3 M (mol/L). From the viewpoint of increasing the yield of the Mg polymer salt (5), the volume of the Mg solution is preferably a volume that is sufficient to replace $Li^+$ with $Mg^{2+}$ and is necessary and as small as possible for dissolving the Li polymer salt (4), and more preferably a minimum volume necessary for dissolving the Li polymer salt (4). Next, a linear ether is added to the obtained Li polymer salt (4) solution to precipitate the Mg polymer salt (5). The reaction (R-2) can be carried out under an inert gas (for example, argon) atmosphere.

The linear ether as a solvent is represented, for example, by general formula (8):

[Chemical Formul 9]

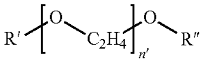

(8)

in the general formula (8), R' and R" each independently represent a hydrocarbon group having 1 to 10 carbon atoms, and n' represents an integer of 1 to 10.

The linear ether represented by the general formula (8) has an ethyleneoxy structural unit. In the linear ether having an ethyleneoxy structural unit, R' and R" in the general formula (8) may each independently be 1 or more and 10 or less aliphatic hydrocarbon groups. In a linear ether having such an ethyleneoxy structural unit, n in the general formula (8) may be an integer of two or more and four or less, and thus, the linear ether may be an ether having two or more and four or more ethyleneoxy structural units. In a linear ether having the “ethyleneoxy structural unit”, R' and R" in the general formula (8) may each independently be lower alkyl groups having 1 or more and 4 or less carbon atoms. In a linear ether solvent having an “ethyleneoxy structural unit”, R' and R" may be the same alkyl groups in the general formula.

Although it is only an example, the linear ether having “ethylene oxy structural units” may be at least one member selected from a group consisting of ethylene glycol dimethyl ether (dimethoxyethane), diethylene glycol dimethyl ether, triethylene glycol dimethyl ether, tetraethylene glycol dimethyl ether, pentaethylene glycol dimethyl ether, hexaethylene glycol dimethyl ether, and polyethylene glycol dimethyl ether. Among them, dimethoxyethane is preferable.

Conventionally, there has been a problem that the Mg polymer salt (5) cannot be efficiently obtained. For example, it was difficult to remove $Li^+$ by a method in which the Li polymer salt (4) is simply dissolved in the Mg salt solution and the solvent is removed, and the Li polymer salt (4) was contained in addition to the target Mg polymer salt (5), and it was impossible to precipitate and recover only the Mg polymer salt (5). As a result of intensive studies, the present inventors found that the solubility of the Li polymer salt (4) in an electrolytic solution containing a glyme solvent greatly varied depending on the electrolyte concentration. Based on this technical finding, the present inventors derived the fact that the solubility of the Li polymer salt (4) in an electrolytic solution containing a glyme solvent can be relatively easily adjusted by the electrolyte concentration in the electrolytic solution (the dependency of the solubility on the electrolyte concentration). In addition, the present inventors predicted that the target Mg polymer salt (5) similarly exhibits the dependency of the solubility on the electrolyte concentration. In addition, the present inventors focused on selective ion exchange and coordination of $Mg^{2+}$ with respect to $L^{+}$ on the basis of electrostatic interaction and solvation between a metal ion and an anionic polymer, and derived the use of a Mg salt as the electrolyte. Furthermore, the present inventors found that the Mg polymer salt (5) can be efficiently precipitated by adding a glyme solvent in a state in which $Mg^{2+}$ is coordinated to the anionic polymer in the Mg salt solution. As a result of further studies based on these technical findings, the present inventors have conceived that by "dissolving the Li polymer salt (4) in a glyme solution of the Mg salt and then adding a glyme solvent", the dissolution of the Li polymer salt (4) and the precipitation of the Mg polymer salt (5) are both satisfied and the Mg polymer salt (5) is efficiently obtained.

In addition to these reactions, necessary steps (for example, processing step and purification step) may be further included. In the processing step, the obtained polymer salt (5) is processed into a prescribed shape, for example, by heat-pressing the obtained polymer salt (5) to form a sheet and cutting the sheet. Examples of the purification step include known methods (more specifically, filtration, chromatography, dialysis, or crystallization).

Next, the electrochemical device of the present application will be described. Such an electrochemical device includes a negative electrode and a positive electrode, and a magnesium electrode is provided as the negative electrode. The electrochemical device is characterized by including a solid electrolyte formed of at least the solid electrolyte described above.

That is, the solid electrolyte of the electrochemical device of the present application contains at least a Mg polymer salt, and the Mg polymer salt contains $Mg^{2+}$ and an anionic polymer having an anionic functional group and a coordinating functional group.

The Mg polymer salt may be, for example, a triblock copolymer (an ABA type triblock copolymer) represented by general formula (1):

[Chemical Formula 10]

(A)-(B)-(A) (1)

in the general formula (1), (A) represents a block having an anionic functional group, (B) represents a block having a coordinating functional group, and the two (A)s may be the same or different from each other.

In the general formula (1), (A) may be a block represented by general formula (2):

[Chemical Formula 11]

(2)

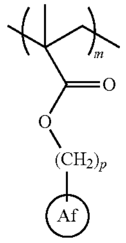

in the general formula (2), Af represents an anionic functional group, m represents an integer of 3 to 40, and p represents an integer of 1 to 10.

In the general formula (2), from the viewpoint of further improving the Mg ion conductivity, p preferably represents 3 and m preferably represents 20 to 40.

In the general formula (2), examples of the alkylene group —$(CH_2)_p$— include a methylene group, an ethylene group, a n-propylene group, a n-butylene group, a n-pentylene group, a n-hexylene group, a n-heptylene group, a n-octylene group, a n-nonylene group, and a n-decylene group. In the m repeating units represented by the general formula (2), the m alkylene groups may be the same or different from each other. Among these alkylene groups, a n-propylene group is preferable from the viewpoint of improving Mg ion conductivity.

The valence of the anionic functional group may be monovalent or polyvalent (for example, divalent). The anionic functional group is preferably a monovalent anionic functional group. In this case, the Mg ion conductivity is further improved. Although not bound by a specific theory, the reason is presumed as follows. The anionic functional group causes an electrostatic attractive force to act between the anionic functional group and a counter ion $Mg^{2+}$ in the solid electrolyte to form an ionic bond. Here, the monovalent anionic functional group forms a relatively weak ionic bond with $Mg^{2+}$ because of its smaller valence than divalent or higher multivalent anionic functional groups. For this reason, the monovalent anionic functional group forms an ionic bond with appropriate strength with $Mg^{2+}$, and the binding of $Mg^{2+}$ as a carrier is controlled. Therefore, it is considered that the ionic transference number of $Mg^{2+}$ is increased and the Mg ion conductivity is further improved.

As the anionic functional group, a perfluoroalkylsulfonylamide group ($C_kF2_{k+1}$—$SO_2$—N_—$SO_2$— group; k represents an integer of 1 to 10) and an —$SO_3^-$ group are more preferable, a perfluoroalkylsulfonylamide group is still more preferable, and a trifluoromethylsulfonylamide group ($CF_3$—$SO_2$—N_—$SO_2$ group) is particularly preferable. The m anionic functional groups in the m repeating units represented by the general formula (2) may be the same as or different from each other.

The perfluoroalkylsulfonylamide group and the —$SO_3^-$ group have a relatively large spatial extent of a negative charge. Therefore, when the anionic functional group is a perfluoroalkylsulfonylamide group or an —$SO_3^-$ group, the anionic functional group forms an ionic bond having a moderate strength with $Mg^{2+}$, and the electrostatic attraction between $Mg^{2+}$ and the anionic functional group acts moderately to such an extent that $Mg^{2+}$ is not strongly bound to the anionic functional group. As described above, it is considered that since the binding of $Mg^{2+}$ by the anionic functional group is controlled, the ionic transference number of $Mg^{2+}$ is increased and the Mg ion conductivity is further improved.

The anionic polymer preferably has an anionic functional group in a side chain, for example, as represented by the general formula (2). In this case, the Mg ion conductivity of the solid electrolyte is further enhanced. Although not bound by a specific theory, the reason is presumed as follows. A side chain of the anionic polymer has a higher degree of freedom of movement than the main chain, so that the anionic polymer moves in the solid electrolyte, for example, so as to swing side chains. Since electrostatic attraction acts between anionic functional groups and $Mg^{2+}$, $Mg^{2+}$ can also move with the movement of the side chains of the anionic polymer. Therefore, it is considered that when the anionic polymer has anionic functional groups in side chains, the ionic transference number of $Mg^{2+}$ is further increased and the Mg ion conductivity of the solid electrolyte is further enhanced.

In the general formula (1), (B) may be a block represented by general formula (3):

[Chemical Formula 12]

(3)

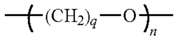

in the general formula (3), n represents an integer of 150 to 850, and q represents an integer of 1 to 10.

In the general formula (3), q preferably represents 2 from the viewpoint of further improving the Mg ion conductivity.

The block represented by the general formula (3) is a poly(alkylene oxide) in which a plurality of alkyleneoxy structural units are linearly bonded. Here, the "alkyleneoxy structural unit" refers to a molecular structural unit in which an alkylene group is bonded to an oxygen atom ($-(CH_2)_q-O-$) (q in the molecular structural unit has the same meaning as q in the general formula (3)).

The poly(alkylene oxide) represented by the general formula (3) is, for example, a poly(alkylene oxide) having 1 to 10 carbon atoms. Examples of the poly(alkylene oxide) include poly(methylene oxide), poly(ethylene oxide), poly(n-propylene oxide), poly(n-butylene oxide), poly(n-pentylene oxide), poly(n-hexylene oxide), poly(n-heptylene oxide), poly(n-heptylene oxide), poly(n-octylene oxide), poly(n-nonylene oxide), and poly(n-decylene oxide). Among these poly(alkylene oxide)s, poly(ethylene oxide) is preferable from the viewpoint of further improving the Mg ion conductivity.

The plurality of alkylene oxide structural units contained in the block represented by the general formula (3) are, for example, a plurality of alkylene oxide structural units having 1 to 10 carbon atoms. Examples of the alkyleneoxy in this structural unit include methyleneoxy, ethyleneoxy, n-propyleneoxy, n-butyleneoxy, n-pentyleneoxy, n-hexyleneoxy, n-heptyleneoxy, n-octyleneoxy, n-nonyleneoxy, and n-decyleneoxy. Among these alkyleneoxy, ethyleneoxy is preferable from the viewpoint of further improving the Mg ion conductivity.

The anionic polymer preferably has a coordinating functional group in the main chain, for example, as represented by the general formula (3). In this case, the Mg ion conductivity is further improved. Although not bound by a specific theory, the reason is presumed as follows. Since a coordinating functional group has a relatively flexible structure, when an anionic polymer has a coordinating functional group in the main chain, the anionic polymer has an increased degree of freedom of movement. Since electrostatic attraction acts between anionic functional groups and $Mg^{2+}$, $Mg^{2+}$ can also move with the movement of the main chain of the anionic polymer. Therefore, it is considered that when the anionic polymer has a coordinating functional group in the main chain, the ionic transference number of $Mg^{2+}$ is increased and the Mg ion conductivity is further improved.

For example, as represented by the general formula (3), the coordinating functional group is preferably poly(alkylene oxide), and more preferably poly(ethylene oxide) (this is the polyalkylene oxide specified when q represents 2 in the general formula (3)). In this case, the Mg ion conductivity is further improved. Although not bound by a specific theory, the reason is presumed as follows. Since poly(ethylene oxide) has a relatively flexible structure, when an anionic polymer has poly(ethylene oxide) as a coordinating functional group, the anionic polymer has an increased degree of freedom of movement. Furthermore, unshared electron pairs of the oxygen atoms of the polyalkylene oxide are easily coordinated to $Mg^{2+}$, the dispersibility of $Mg^{2+}$ in the solid electrolyte is further improved. As a result, it is considered that the ionic transference number of $Mg^{2+}$ is increased and the Mg ion conductivity is further improved.

The Mg polymer salt represented by the general formula (1) may be, for example, a Mg polymer salt represented by the general formula (5):

[Chemical Formula 13]

(5)

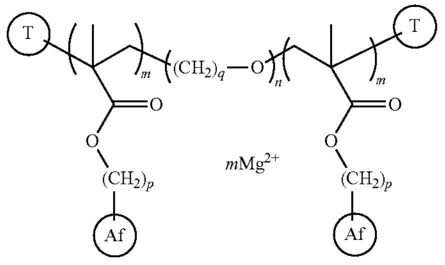

in the general formula (5), Af represents an anionic functional group, T represents a terminal group, m represents an integer of 3 to 40, n represents an integer of 150 to 850, p and q each represent an integer of 1 to 10, and p and q may be the same or different from each other (hereinafter, the Mg polymer salt represented by the general formula (5) is also referred to as "Mg polymer salt (5)").

It is noted that m, p and Af, and n and q in the general formula (5) have the same meanings as m, p and Af in the general formula (2), and n and q in the general formula (3), respectively. T in the general formula (5) may be, for example, $C_6H_5C(=S)S-$. Af in the general formula (5) represents a monovalent anionic functional group.

The number average molecular weight Mn of the Mg polymer salt is, for example, 12,000 to 60,000. A method for measuring the number average molecular weight of the Mg polymer salt will be described in detail in Examples.

Examples of the Mg polymer salt (5) include a Mg polymer salt represented by the general formula (5-2):

[Chemical Formula 14]

(5-2)

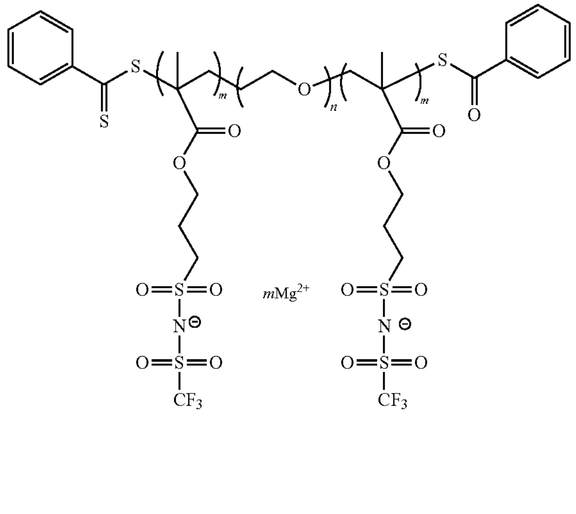

in the general formula (5-2), m represents an integer of 3 to 40, and n represents an integer of 150 to 850 (hereinafter also referred to as "Mg polymer salt (5-2)").

The solid electrolyte may be composed of a Mg polymer salt.

In the electrochemical device of the present application, the positive electrode is preferably a sulfur electrode containing at least sulfur. That is, the sulfur electrode of the electrochemical device of the present application is preferably configured as a positive electrode of sulfur (S) such as $S_8$ and/or polymeric sulfur. Since the negative electrode is a magnesium electrode, the electrochemical device of the present application is an electrochemical device provided with a pair of magnesium electrode-sulfur electrodes and has a suitable solid electrolyte, the improvement of coulombic efficiency of the negative electrode can be intended while providing desired cycle characteristics to such a positive electrode.

Since the sulfur electrode is an electrode containing at least sulfur, the sulfur electrode may contain a conductive auxiliary agent and/or a binder and the like, in addition to this. In such a case, the sulfur content in the sulfur electrode may be 5% by mass or more and 95% by mass or less, preferably 70% by mass or more and 90% by mass or less based on the entire electrode.

Examples of the conductive auxiliary agent contained in the sulfur electrode used as a positive electrode include carbon materials such as graphite, carbon fiber, carbon black, and carbon nanotubes, and these can be used singly or in mixture of two or more kinds thereof. As the carbon fiber, for example, vapor growth carbon fiber (VGCF (registered trademark)) and the like can be used. As the carbon black, for example, acetylene black and/or Ketjen black can be used. As the carbon nanotube, for example, a single-wall carbon nanotube (SWCNT) and/or a multi-wall carbon nanotube (MWCNT) such as a double-wall carbon nanotube (DWCNT) can be used. A material other than the carbon materials can also be used as long as the material has good conductivity. For example, a metal material such as a Ni powder, and/or a conductive polymer material or the like can also be used. Examples of the binder contained in the sulfur electrode used as the positive electrode include polymer resins such as a fluorine-based resin (e.g., polyvinylidene difluoride (PVdF) and/or polytetrafluoroethylene (PTFE)), a polyvinyl alcohol (PVA)-based resin, and/or a styrene-butadiene copolymerization rubber (SBR)-based resin. In addition, a conductive polymer may also be used as the binder. As conductive polymers, for example, substituted or unsubstituted polyaniline, polypyrrole, and polythiophene, and (co)polymers produced from one kind or two kinds selected from these can be used.

On the other hand, in the electrochemical device according to the present application, a material (specifically, a negative electrode active material) constituting the negative electrode is, because of the "magnesium electrode", formed of metal element magnesium, a magnesium alloy, or a magnesium compound. When the negative electrode is made of a simple substance of magnesium (for example, magnesium plate or the like), a Mg purity of the simple substance is 90% or more, preferably 95% or more, and more preferably 98% or more. The negative electrode can be produced from, for example, a plate-like material or a foil-like material, but is not limited thereto, and can be formed (shaped) using a powder.

The negative electrode may have a structure in which a negative electrode active material layer is formed in the vicinity of the surface the negative electrode. For example, the negative electrode may include, as the negative electrode active material layer, a layer containing magnesium (Mg), further containing at least any of carbon (C), oxygen (O), sulfur (S) and a halogen, and having magnesium ion conductivity. Such a negative electrode active material layer may be one having a single peak derived from magnesium in the range of 40 eV to 60 eV inclusive, which is, however, no more than an example. The halogen is, for example, at least one selected from the group consisting of fluorine (F), chlorine (Cl), bromine (Br), and iodine (I). In this case, the negative electrode active material layer may have a single peak derived from magnesium in the range of 40 eV to 60 eV inclusive from a surface thereof across to a depth of $2\times10^{-7}$ m. This is because the negative electrode active material layer exhibits good electrochemical activity from the surface across to the inside thereof. Due to the same reason, the negative electrode active material layer may have an almost constant oxidation state of magnesium from the surface thereof across to a distance of $2\times10^{-7}$ nm in the depth direction. Here, the surface of the negative electrode active material layer means, of both surfaces of the negative electrode active material layer, a surface on a side constituting a surface of the electrode, and a back surface is a surface on side opposite to this surface, that is, a surface on a side constituting an interface between a current collector and the negative electrode active material layer. It is possible to confirm by XPS (X-ray Photoelectron Spectroscopy) whether or not the negative electrode active material layer the elements described above. It is also possible to similarly confirm by the XPS that the negative electrode active material layer has the peak described above and an oxidation state of magnesium.

In the electrochemical device of the present application, preferably, the positive electrode and the negative electrode are separated from each other by an inorganic or organic separator through which magnesium ions can pass, while preventing the occurrence of short circuit due to the contact between the positive electrode and the negative electrode. Examples of inorganic separators include glass filters and glass fibers. Examples of the organic separator include a synthetic resin porous film including polytetrafluoroethylene, polypropylene, and/or polyethylene, and can have a structure in which two or more kinds of these porous films are laminated. Above all, a porous membrane made of polyolefin is preferable because this is superior in short-circuit prevention effect and can improve the safety of batteries by a shutdown effect.

The magnesium electrode-based electrochemical device described above can be configured as a secondary battery, and a conceptual diagram in that case is shown in FIG. 1. As shown in the figure, during charging, magnesium ions ($Mg^{2+}$) move from a positive electrode 10 to a negative electrode 11 through an electrolyte layer 12 to convert electrical energy into chemical energy and store electricity. During discharging, magnesium ions return from the negative electrode 11 to the positive electrode 10 through the electrolyte layer 12 to generate electric energy.

When the electrochemical device is formed as a battery (a primary battery or a secondary battery) including the solid electrolyte (hereinafter also referred simply to as "electrolyte") according to the present application, the battery can be used as a driving power supply or an auxiliary power supply of, for example, a notebook personal computer, a PDA (personal digital assistant), a mobile phone, a smartphone, a cordless phone base unit/handset, a video camera, a digital still camera, an electronic book, an electronic dictionary, a portable audio player, a radio, a headphone, a game device, a navigation system, a memory card, a pacemaker, a hearing aid, an electric tool, an electric shaver, a refrigerator, an air conditioner, a TV receiver, a stereo, a water heater, a microwave, a dishwasher, a washing machine, a dryer, a lighting device, a toy, a medical device, a robot, a load conditioner, a traffic light, a railway vehicle, a golf cart, an electric cart, and/or an electric car (including a hybrid car). In addition, the battery can be mounted on a building such as a house, a power source for power storage that is used for power generation facilities, or the like, or can be used in order to supply electric power thereto. In an electric car, a conversion device that converts electric power into a driving force by supplying electric power is generally a motor. Examples of the control device (control unit) that processes information related to vehicle control includes a control device that displays the remaining battery level based on information on the remaining battery level. The battery can also be used in an electric storage device in a so-called smart grid. Such a power storage device can not only supply electric power but also store electric power by receiving electric power supply from other power source. As the "other power source", thermal power generation, nuclear power generation, hydroelectric power generation, a solar battery, wind power generation, geothermal power generation, and/or a fuel cell (including a biofuel cell) can be used.

The electrochemical device (that is, the secondary battery) according to the present application is applicable to a battery pack including a secondary battery, control means (or a control unit) that performs control involving the secondary battery, and an exterior encompassing the secondary battery. In the battery pack, the control means can control, for example, charge/discharge, overdischarge or overcharge of the secondary battery.

The electrochemical device (namely, the secondary battery) of the present application can also be applied to an electronic apparatus that receives supply of electric power from a secondary battery.

The electrochemical device of the present application (i.e., secondary battery) can also be applied to electric vehicles having a converter that receives power from the secondary battery and converts the power into the driving force of the vehicle, and a control device (or control unit) that processes information related to vehicle control based on information on the secondary battery. In such an electric vehicle, the converter typically receives power from a secondary battery to drive the motor and generate driving force. The motor can be driven also by utilizing regenerative energy. The control device (or control unit) performs information processing related to vehicle control based on, for example, the remaining battery level of the secondary battery. Examples of such an electric vehicle include an electric car, an electric motorcycle, an electric bicycle, and a railway vehicle, and also a so-called hybrid vehicle.

The electrochemical device of the present application can be applied to a secondary battery in an electric power system configured to receive supply of electric power from a secondary battery and/or supply electric power from a power source to a secondary battery. Such an electric power system may be any electric power system as long as it approximately uses electric power, and also includes a simple electric power device. Such power systems include, for example, smart grids, household energy management systems (HEMS), and/or vehicles, and can also store electricity.

The electrochemical device (that is, secondary battery) of the present application can be applied to a power storage power source configured to have a secondary battery and be connected to an electronic device to which electric power is supplied. This power source for power storage can be basically used for any power system or power device regardless of the application of the power source for power storage, and can be used for a smart grid, for example.

Other details such as more detailed matters and further specific aspects of the electrochemical device of the present application are described and mentioned above, and therefore the description thereof may be omitted to avoid duplication.

Here, the case where the magnesium electrode-based electrochemical device of the present application is used as a secondary battery will be described in more detail. Hereinafter, such a secondary battery is also referred to as a "magnesium secondary battery".

The magnesium secondary battery as the electrochemical device of the present application can be applied to machines, apparatuses, appliances, devices, and systems (assemblies of a plurality of apparatuses and the like) which can utilize the magnesium secondary battery as a driving/operating power source or an electric power storage source for electric power accumulation without particular limitation. The magnesium secondary battery (for example, a magnesium-sulfur secondary battery) used as a power source may be a main power source (a power source used preferentially) or an auxiliary power source (a power source used in place of or switched from the main power source). When a magnesium secondary battery is used as an auxiliary power source, the main power source is not limited to a magnesium secondary battery.

Examples of applications of the magnesium secondary battery (particularly the magnesium-sulfur secondary battery) include various electronic devices such as video cameras, camcorders, digital still cameras, mobile phones, personal computers, television receivers, various display devices, cordless phones, headphone stereos, music players, portable radios, electronic books, and/or electronic papers such as electronic newspapers, portable information terminals including PDAs, and electrical devices (including portable electronic devices); toys; portable living appliances such as electric shavers; lighting appliances such as interior lights; medical electronic devices such as pacemakers and/or hearing aids; storage devices such as memory cards; battery packs used for personal computers as removable power supplies; power tools such as electric drills and/or electric saws; power storage systems such as household battery systems that store power in case of emergency, home energy servers (household power storage devices), and power supply systems; power storage units and/or backup power supplies; electric vehicles such as electric cars, electric bikes, electric bicycles, and/or Segway (registered trademark); driving electric power converters (specifically, for example, power motors) for aircraft and/or ships, and however, the present application is not limited to these uses.

Among them, the magnesium secondary battery (particularly the magnesium-sulfur secondary battery) is effectively applied to battery packs, electric vehicles, power storage systems, power supply systems, power tools, electronic devices, and/or electrical devices. The battery pack is a power supply using a magnesium secondary battery, and is a so-called assembled battery or the like. The electric vehicle is a vehicle that operates (for example, travels) using a magnesium secondary battery as a driving power source, and may be an automobile also including a driving source other than the secondary battery (for example, a hybrid car). An electric power storage system (for example, an electric power supply system) is a system using a magnesium secondary battery as an electric power storage source. For example, in a household electric power storage system (for example, an electric power supply system), electric power is accumulated in a magnesium secondary battery which is an electric power storage source and household electric appliances and the like can be thus used by utilizing the electric power. A power tool is a tool in which a moving unit (for example, a drill) moves using a magnesium secondary battery as a driving power source. Electronic apparatuses and electrical apparatus are apparatuses which exert various functions using a magnesium secondary battery as a power source for operation (namely, a power supply source).

Hereinafter, a cylindrical magnesium secondary battery and a flat laminated film type magnesium secondary battery will be described.

Figure 2:
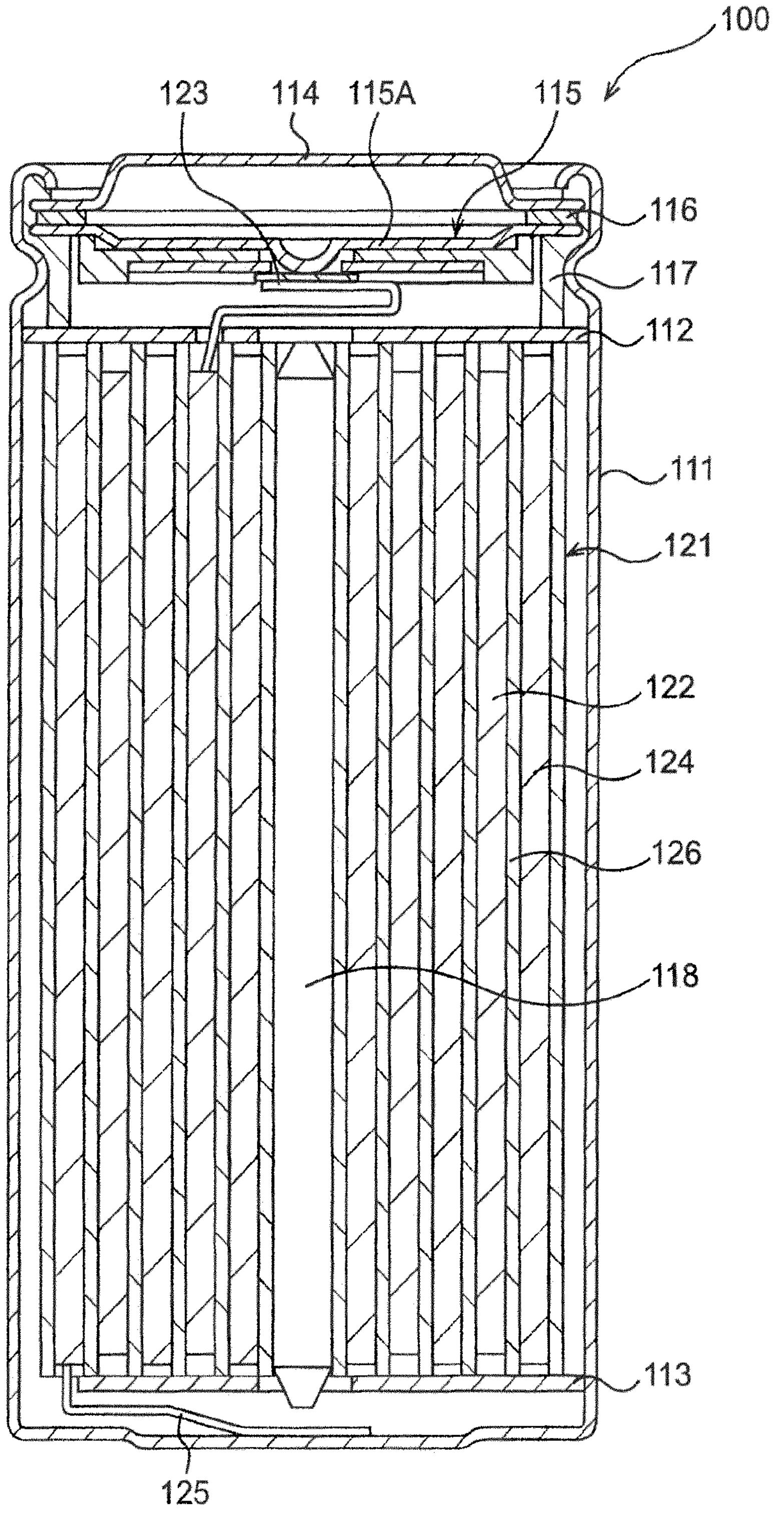
FIG. 2 is a schematic sectional view of a magnesium secondary battery (cylindrical magnesium secondary battery) provided as an embodiment of the present application.

FIG. 2 shows a schematic sectional view of a cylindrical magnesium secondary battery 100. In the magnesium secondary battery 100, an electrode structure 121 and a pair of insulating plates 112 and 113 are housed inside an electrode structure housing member 111 having a substantially hollow columnar shape. The electrode structure 121 can be fabricated by, for example, laminating a positive electrode 122 and a negative electrode 124 with a separator 126 interposed therebetween to obtain an electrode structure and then winding the electrode structure. The electrode structure housing member (for example, a battery can) 111 has a hollow structure in which one end is closed and the other end is open, and includes iron (Fe) and/or aluminum (Al). The pair of insulating plates 112 and 113 are disposed so as to sandwich the electrode structure 121 and extend perpendicularly to the winding peripheral face of the electrode structure 121. A battery lid 114, a safety valve mechanism 115, and a positive temperature coefficient element (PTC element) 116 are crimped to the open end portion of the electrode structure housing member 111 with a gasket 117 interposed therebetween, and the electrode structure housing member 111 is thus sealed. The battery lid 114 is fabricated using, for example, the same material as that for the electrode structure housing member 111. The safety valve mechanism 115 and the positive temperature coefficient element 116 are provided on the inner side of the battery lid 114, and the safety valve mechanism 115 is electrically connected to the battery lid 114 via the positive temperature coefficient element 116. In the safety valve mechanism 115, a disk plate 115A is reversed when the internal pressure is raised to a certain level or more by an internal short circuit, external heating and/or the like. As a result, the electrical connection between the battery lid 114 and the electrode structure 121 is disconnected. In order to prevent abnormal heat generation due to a large amount of current, the resistance of the positive temperature coefficient element 116 increases as the temperature rises. The gasket 117 is includes, for example, an insulating material. The surface of the gasket 117 may be coated with asphalt or the like.

A center pin 118 is inserted into the winding center of the electrode structure 121. However, the center pin 118 may not be inserted into the winding center. A positive electrode lead portion 123 including a conductive material such as aluminum is connected to the positive electrode 122. Specifically, the positive electrode lead portion 123 is attached to a positive electrode current collector. A negative electrode lead portion 125 including a conductive material such as copper is connected to the negative electrode 124. Specifically, the negative electrode lead portion 125 is attached to a negative electrode current collector. The negative electrode lead portion 125 is welded to the electrode structure housing member 111 and is electrically connected to the electrode structure housing member 111. The positive electrode lead portion 123 is welded to the safety valve mechanism 115 as well as is electrically connected to the battery lid 114. In the example illustrated in FIG. 2, the negative electrode lead portion 125 is provided at one location (the outermost peripheral portion of the wound electrode structure), but may be provided at two locations (the outermost peripheral portion and innermost peripheral portion of the wound electrode structure).

The electrode structure 121 is formed of the positive electrode 122 and the negative electrode 124 laminated with the separator 126 interposed therebetween, the positive electrode 122 having positive electrode active material layers formed on the positive electrode current collector (more specifically, on both sides of the positive electrode current collector), the separator 126 having negative electrode active material layers formed on the negative electrode current collector (more specifically, on both sides of a negative electrode current collector). The positive electrode active material layer is not formed in a region of the positive electrode current collector to which the positive electrode lead portion 123 is attached, and the negative electrode active material layer is not formed in a region of the negative electrode current collector to which the negative electrode lead portion 125 is attached.

The magnesium secondary battery 100 can be manufactured, for example, based on the following procedure.

First, positive electrode active material layers are formed on both surfaces of the positive electrode current collector, and negative electrode active material layers are formed on both surfaces of the negative electrode current collector.

Subsequently, the positive electrode lead portion 123 is attached to the positive electrode current collector by a welding method or the like. In addition, the negative electrode lead portion 125 is attached to the negative electrode current collector by a welding method or the like. Subsequently, the positive electrode 122 and the negative electrode 124 are stacked with a separator 126 including a microporous polyethylene film interposed therebetween, and are wound (more specifically, the electrode structure (that is, stacked structure) of the positive electrode 122/separator 126/negative electrode 124/separator 126 is wound) to manufacture the electrode structure 121. Thereafter, a protective tape (not shown) is adhered to an outermost peripheral portion. Thereafter, the center pin 118 is inserted into a center of the electrode structure 121. Subsequently, the electrode structure 121 is housed inside the electrode structure housing member 111 while the electrode structure 121 is sandwiched between the pair of insulating plates 112,113. In this case, a tip of the positive electrode lead portion 123 is attached to the safety valve mechanism 115, and a tip of the negative electrode lead portion 125 is attached to the electrode structure housing member 111 using a welding method or the like. Thereafter, an electrolyte is injected based on a decompression method, and the separator 126 is impregnated with the electrolyte. Subsequently, the battery lid 114, the safety valve mechanism 115, and the positive temperature coefficient element 116 are crimped at the opening end portion of the electrode structure housing member 111 with the gasket 117 interposed therebetween.

Figure 3:
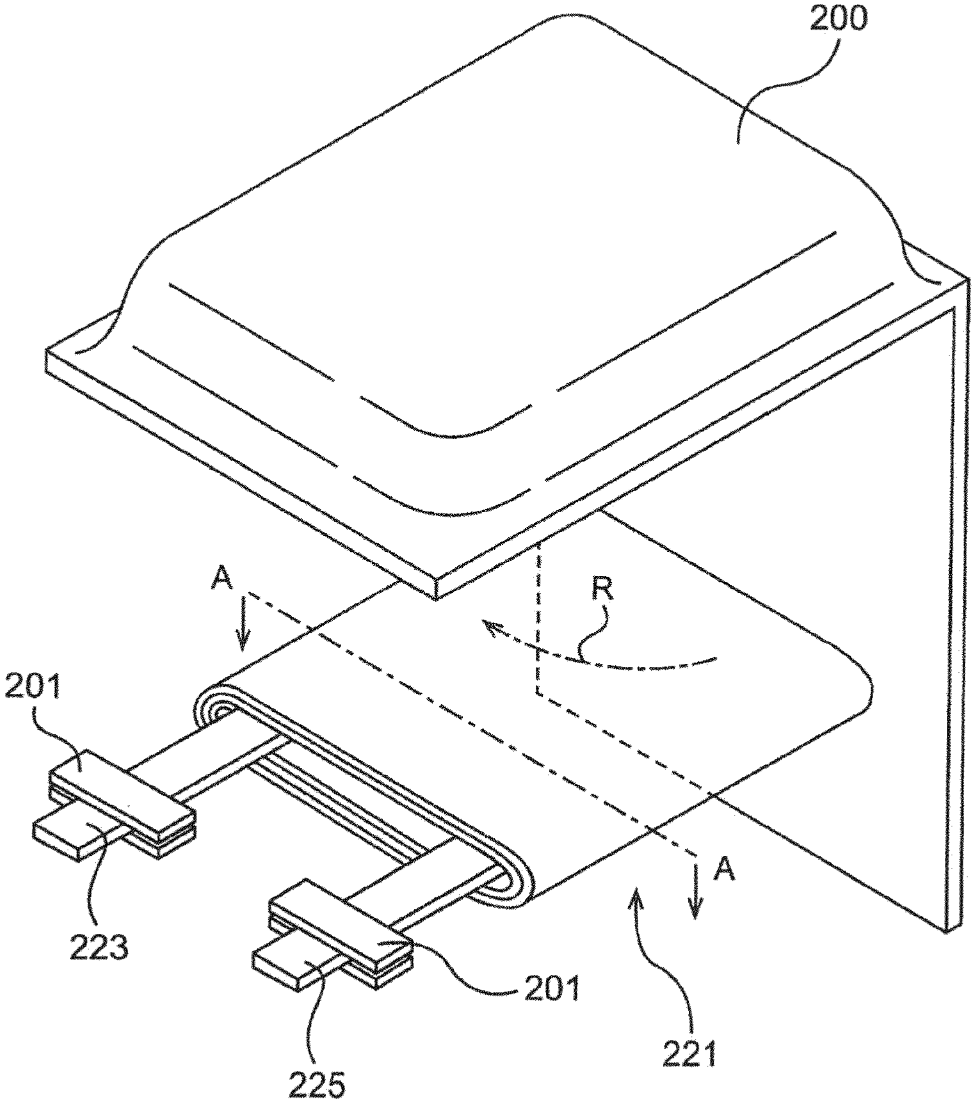
FIG. 3 is a schematic perspective view of a magnesium secondary battery (flat plate type laminated film type magnesium secondary battery) provided as an embodiment of the present application.

Next, a flat plate type laminated film type secondary battery will be described. FIG. 3 shows a schematic exploded perspective view of such a secondary battery. In this secondary battery, an electrode structure 221 basically the same as that described above is housed inside an exterior member 200 formed of a laminated film. The electrode structure 221 can be fabricated by laminating a positive electrode and a negative electrode with a separator and an electrolyte layer interposed therebetween and then winding this electrode structure. A positive electrode lead portion 223 is attached to the positive electrode and a negative electrode lead portion 225 is attached to the negative electrode. The outermost peripheral portion of the electrode structure 221 is protected by a protective tape. The positive electrode lead portion 223 and the negative electrode lead portion 225 protrude in the same direction from the inside to the outside of the exterior member 200. The positive electrode lead portion 223 is formed of a conductive material such as aluminum. The negative electrode lead portion 225 includes a conductive material such as copper, nickel, and/or stainless steel.

The exterior member 200 is a single film foldable in the direction of the arrow R illustrated in FIG. 3, and a recess (for example, emboss) for housing the electrode structure 221 is provided in a part of the exterior member 200. The exterior member 200 is, for example, a laminate film in which a fusion layer, a metal layer, and a surface protective layer are stacked in this order. In a step of manufacturing the secondary battery, the exterior member 200 is folded such that the fusion layers face each other with the electrode structure 221 interposed therebetween, and then the outer peripheral edges of the fusion layers are fused to each other. However, the exterior member 200 may be formed by bonding two separate laminate films to each other with an adhesive or the like interposed therebetween. The fusion layer includes, for example, a film of polyethylene and/or polypropylene. The metal layer includes, for example, an aluminum foil or the like. The surface protective layer includes, for example, nylon and/or polyethylene terephthalate. In particular, the exterior member 200 is preferably an aluminum laminate film in which a polyethylene film, an aluminum foil, and a nylon film are stacked in this order. However, the exterior member 200 may be a laminate film having another laminated structure, a polymer film such as polypropylene, or a metal film. Specifically, the exterior member 200 may include a moisture-resistant aluminum laminate film in which a nylon film, an aluminum foil, and an unstretched polypropylene film are stacked in this order from the outside.

A close contact film 201 is inserted between the exterior member 200 and the positive electrode lead portion 223 and between the exterior member 200 and the negative electrode lead portion 225 in order to prevent the intrusion of outside air. The close contact film 201 may be formed of a material exhibiting close contact property to the positive electrode lead portion 223 and the negative electrode lead portion 225, for example, a polyolefin resin or the like, more specifically, a polyolefin resin such as polyethylene, polypropylene, modified polyethylene, or modified polypropylene.

Although the above description has focused primarily on secondary batteries, the present disclosure also applies to other electrochemical devices such as capacitors, air batteries, and fuel cells. This will be described below.

Figure 4:
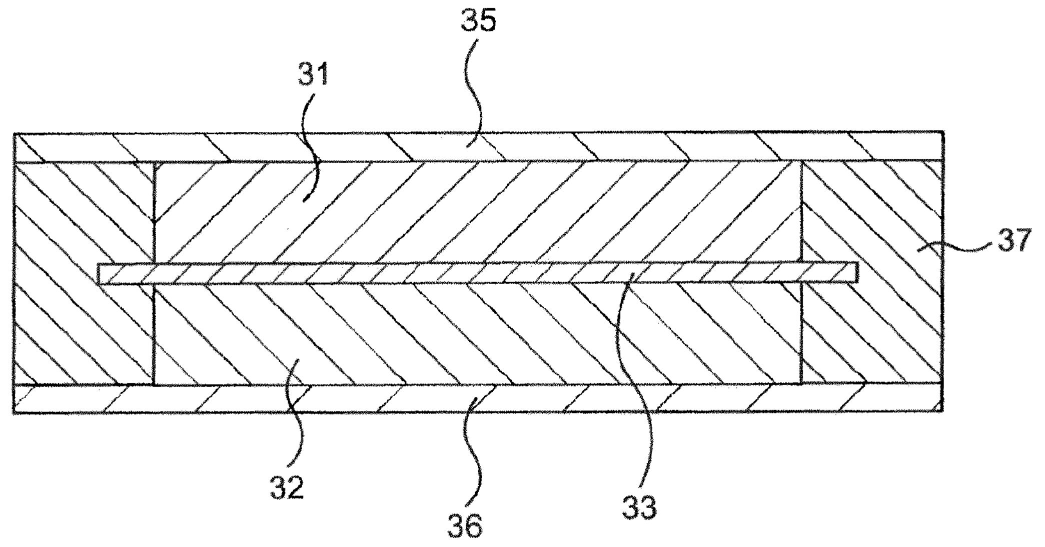
FIG. 4 is a schematic sectional view of an electrochemical device provided as a capacitor in an embodiment of the present application.

The electrochemical device of the present application can be provided as a capacitor of which a schematic sectional view is illustrated in FIG. 4. In the capacitor, a positive electrode 31 and a negative electrode 32 are disposed so as to face each other with a separator 33, which contains an electrolyte, interposed therebetween. Reference numerals 35 and 36 denote current collectors, and reference numeral 37 denotes a gasket.

Figure 5:
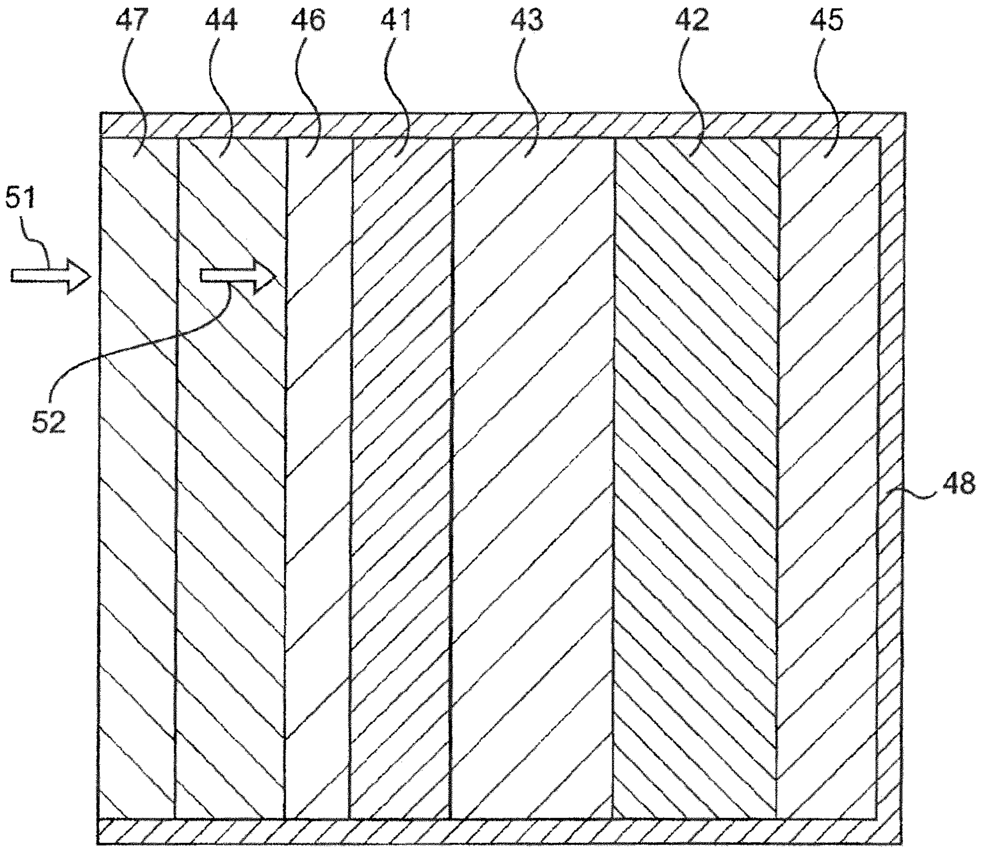
FIG. 5 is a schematic sectional view of an electrochemical device provided as an air battery in an embodiment of the present application.

Alternatively, the electrochemical device of the present application can also be provided as an air battery as illustrated in the conceptual diagram of FIG. 5. The air battery is formed of, for example, an oxygen-selective permeable film 47 that hardly allows water vapor to permeate but selectively allows oxygen to permeate therethrough, an air electrode side current collector 44 made from a conductive porous material, a porous diffusion layer 46 disposed between the air electrode side current collector 44 and a porous positive electrode 41 and made from a conductive material, the porous positive electrode 41 containing a conductive material and a catalyst material, a separator and a solid electrolyte (or a solid electrolyte including a solid electrolyte) 43 that hardly allow water vapor to pass therethrough, a negative electrode 42 that releases a magnesium ion, a negative electrode-side current collector 45, and an exterior body 48 housing these layers.

Oxygen 52 in air (for example, atmosphere) 51 is selectively allowed to permeate the oxygen-selective permeable film 47, passes through the air electrode side current collector 44 including the porous material, is diffused by the diffusion layer 46, and is supplied to the porous positive electrode 41. The travel of the oxygen that has permeated through the oxygen-selective permeable film 47 is blocked in part by the air electrode side current collector 44, but since the oxygen that has passed through the air electrode side current collector 44 is diffused and spread by the diffusion layer 46, the oxygen efficiently spreads over the entire porous positive electrode 41, and the supply of oxygen to the entire surface of the porous positive electrode 41 is not inhibited by the air electrode side current collector 44. In addition, since the permeation of water vapor is controlled by the oxygen-selective permeable film 47, deterioration due to the influence of moisture in the air is small, and oxygen is efficiently supplied to the entire porous positive electrode 41, so that the battery output can be increased and the battery can be stably used for a long period.

As for the negative electrode in the electrochemical device, a Mg metal plate can be used, and the negative electrode can also be produced by the following method. For example, a Mg plating layer may be formed on a Cu foil as a negative electrode active material layer by preparing a Mg solid electrolyte (Mg-EnPS) containing $MgCl_2$ and EnPS (ethyl-n-propylsulfone), and depositing Mg metal on a Cu foil based on an electrolytic plating method using the Mg solid electrolyte. An XPS analysis on a surface of the Mg plating layer obtained by this technique has resulted in clarifying the presence of Mg, C, O, S, and Cl on the surface of the Mg plating layer, a Mg-derived peak observed by the surface analysis has not been split, and a single Mg-derived peak has been observed in the range of 40 eV to 60 eV inclusive. Further, the surface of the Mg plating layer has been excavated about 200 nm in the depth direction by an Ar sputtering method and analyzed by XPS. The XPS analysis has resulted in clarifying that the position and the shape of the Mg-derived peak after the Ar sputtering have no change from the position and the shape of the peak before the Ar sputtering.

The electrochemical device of the present application can be used particularly as a magnesium secondary battery as described with reference to FIGS. 1 to 3, and several application examples of this magnesium secondary battery will be described more specifically. It is noted that the configuration of each application example described below is merely an example and the configuration can be appropriately changed.

The magnesium secondary battery can be used in the form of a battery pack. Such a battery pack is a simple battery pack (so-called soft pack) using a magnesium secondary battery, and is mounted on, for example, an electronic device typified by a smartphone. Alternatively or additionally, the battery pack may include an assembled battery including six magnesium secondary batteries connected in 2 parallel and 3 series. The connection type of the magnesium secondary batteries may be in series, in parallel, or a combination of both.

Figure 6:
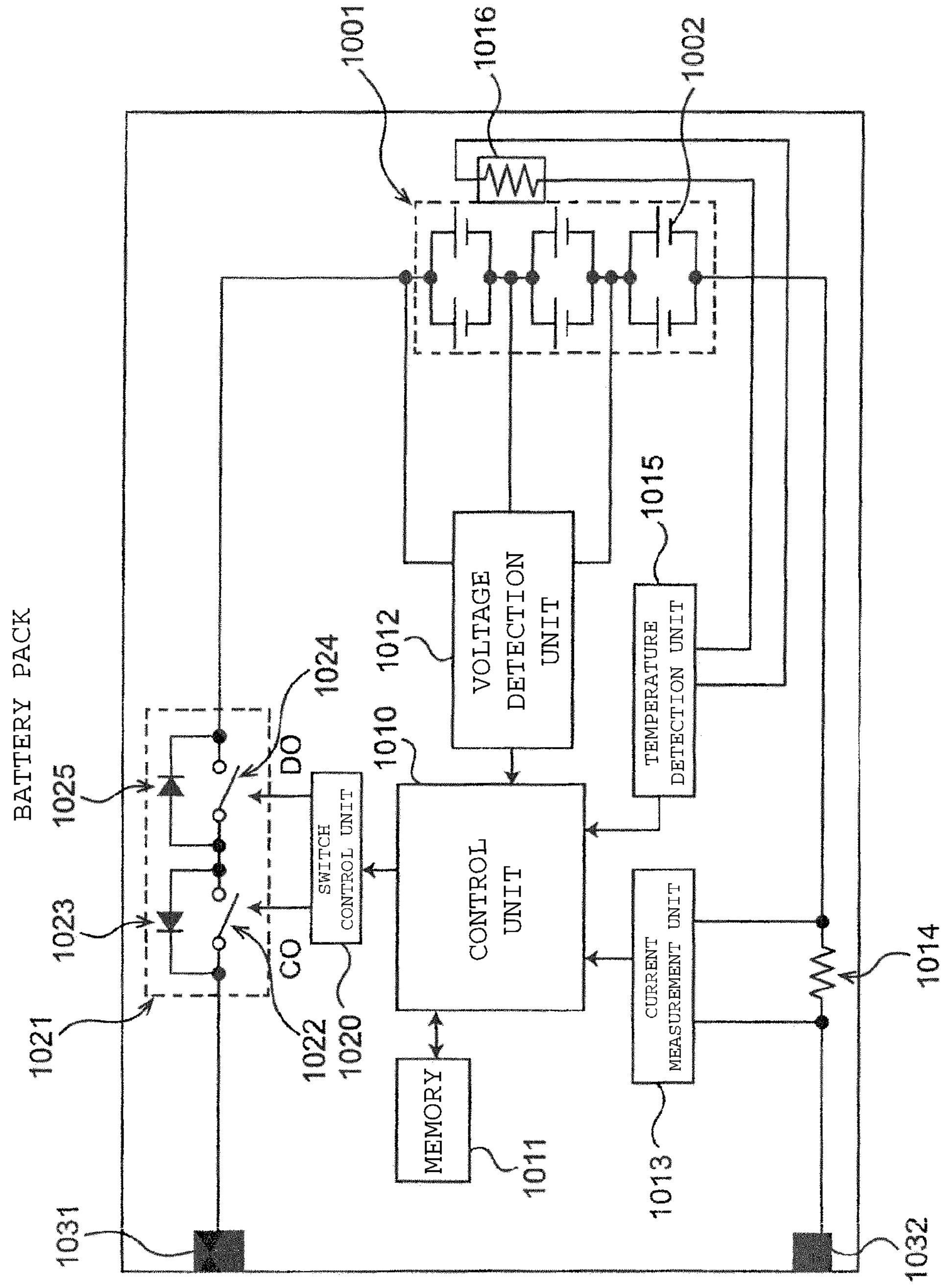
FIG. 6 is a block diagram showing a circuit configuration example in a case where a magnesium secondary battery provided as an embodiment of the present application is applied to a battery pack.

FIG. 6 shows a block diagram showing a circuit configuration example in a case where the magnesium secondary battery of the present application is applied to a battery pack. The battery pack includes a cell (for example, an assembled battery) 1001, an exterior member, a switch unit 1021, a current detection resistor 1014, a temperature detection element 1016, and a control unit 1010. The switch unit 1021 includes a charge control switch 1022 and a discharge control switch 1024. The battery pack also includes a positive electrode terminal 1031 and a negative electrode terminal 1032. During charging, the positive electrode terminal 1031 and the negative electrode terminal 1032 are respectively connected to a positive electrode terminal and a negative electrode terminal of a charger, and the charge is thus performed. When an electronic device is used, the positive electrode terminal 1031 and the negative electrode terminal 1032 are connected to a positive electrode terminal and a negative electrode terminal of the electronic device, respectively and discharge is carried out.

The cell 1001 is configured by connecting a plurality of magnesium secondary batteries 1002 in the present disclosure in series and/or in parallel. Although FIG. 6 shows a case where six magnesium secondary batteries 1002 are connected in 2 parallel and 3 series (2P3S), any other connection manner such as p parallel q series (where p and q are integers) may be employed.

The switch unit 1021 includes the charge control switch 1022 and a diode 1023 and a discharge control switch 1024 and a diode 1025, and is controlled by the control unit 1010. The diode 1023 exhibits polarity in the backward direction with respect to the charge current flowing from the positive electrode terminal 1031 toward the cell 1001 and in the forward direction with respect to the discharge current flowing from the negative electrode terminal 1032 toward the cell 1001. The diode 1025 has a forward polarity with respect to the charge current and a backward polarity with respect to the discharge current. In the example, the switch unit is provided on the plus (+) side, but may be provided on the minus (−) side. The control unit 1010 controls the charge control switch 1022 such that the charge control switch 1022 is closed when the battery voltage has reached the overcharge detection voltage, and no charge current flows in the current path of the cell 1001. After the charge control switch 1022 is closed, only discharge can be performed through the diode 1023. In addition, the control unit 1010 controls the charge control switch 1022 such that the charge control switch 1022 is closed in a case where a large amount of current flows during charge, and a charge current flowing in a current path of the cell 1001 is cut off. The control unit 1010 controls the discharge control switch 1024 such that the discharge control switch 1024 is closed when the battery voltage has reached the overdischarge detection voltage, and no discharge current flows in the current path of the cell 1001. After the discharge control switch 1024 is closed, only charge can be performed through the diode 1025. In addition, the control unit 1010 controls the discharge control switch 1024 such that the discharge control switch 1024 is closed in a case where a large amount of current flows during discharge, and a discharge current flowing in a current path of the cell 1001 is cut off.

The temperature detection element 1016 includes, for example, a thermistor and is provided in the vicinity of the cell 1001, and the temperature measurement unit 1015 measures the temperature of the cell 1001 using the temperature detection element 1016 and sends the measurement result to the control unit 1010. A voltage measurement unit 1012 measures the voltage of the cell 1001 and the voltage of each of the magnesium secondary batteries 1002 constituting the cell 1001, A/D converts the measurement results, and sends the converted result to the control unit 1010. A current measurement unit 1013 measures a current using the current detection resistor 1014, and sends the measurement result to the control unit 1010.

The switch control unit 1020 controls the charge control switch 1022 and discharge control switch 1024 of the switch unit 1021 based on the voltage and current sent from the voltage measurement unit 1012 and current measurement unit 1013. The switch control unit 1020 prevents overcharge, overdischarge, and overcurrent charge and discharge by sending a control signal to the switch unit 1021 when the voltage of any of the magnesium secondary batteries 1002 falls below the overcharge detection voltage or overdischarge detection voltage, and/or when a large current suddenly flows. The charge control switch 1022 and the discharge control switch 1024 each can be constituted of, for example, a semiconductor switch such as MOSFET. In this case, the diodes 1023 and 1025 are each constituted of a parasitic diode of MOSFET. In a case where a p-channel FET is used as a MOSFET, the switch control unit 1020 supplies a control signal DO and a control signal CO to the gates of the charge control switch 1022 and the discharge control switch 1024, respectively. The charge control switch 1022 and the discharge control switch 1024 become conductive due to a gate potential lower than the source potential by a prescribed value or more. That is, in normal charge and discharge operations, the control signals CO and DO are set at low levels, and the charge control switch 1022 and the discharge control switch 1024 are kept conductive. In addition, for example, at the time of overcharge or overdischarge, the control signals CO and DO are set at high levels, and the charge control switch 1022 and the discharge control switch 1024 are closed.

A memory 1011 includes, for example, an erasable programmable read only memory (EPROM), which is a non-volatile memory. The memory 1011 stores in advance a numerical value calculated by the control unit 1010 and/or an internal resistance value and the like of each of the magnesium secondary batteries 1002 in the initial state measured at the stage of the manufacturing process, and these values can be rewritten as appropriate. In addition, by storing the full charge capacitance of the magnesium secondary battery 1002, the memory 1011 can calculate, for example, a remaining capacity together with the control unit 1010.

The temperature measurement unit 1015 measures temperature using the temperature detection element 1016, perform charge/discharge control at the time of abnormal heat generation, and performs correction in calculation of the remaining capacity.

Figure 7A:
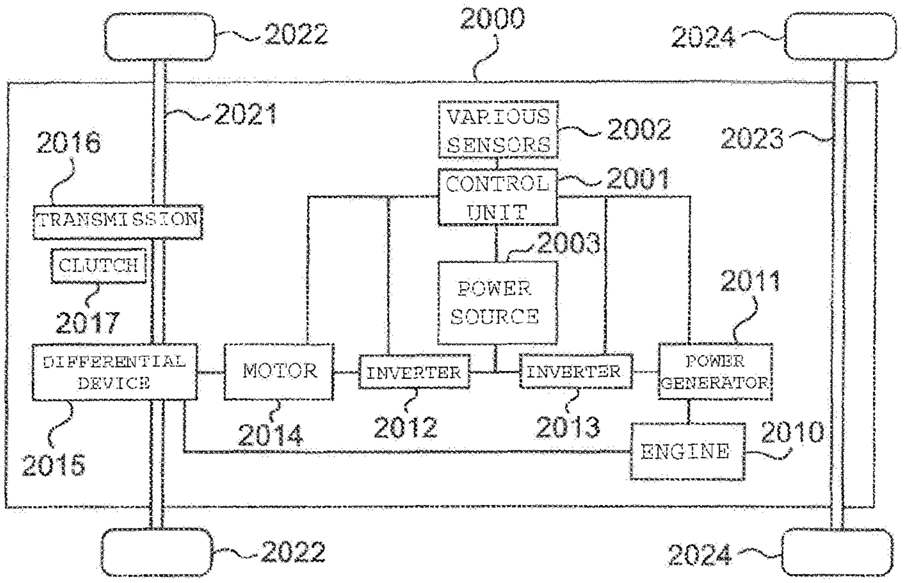
FIGS. 7A, 7B, and 7C are block diagrams illustrating the configurations of an electric vehicle, a power storage system, and an electric tool to which a magnesium secondary battery is applied as an embodiment of the present application.

Next, the application of the magnesium secondary battery to an electric vehicle will be described. FIG. 7A shows a block diagram showing a configuration of an electric vehicle such as a hybrid car, which is one example of the electric vehicle. The electric vehicle includes, for example, a control unit 2001, various sensors 2002, a power source 2003, an engine 2010, a power generator 2011, inverters 2012, 2013, a driving motor 2014, a differential device 2015, a transmission 2016, and a clutch 2017 in a metal housing 2000. In addition, the electric vehicle includes, for example, a front wheel drive shaft 2021, front wheels 2022, a rear wheel drive shaft 2023, and rear wheels 2024 connected to the differential device 2015 and/or the transmission 2016.

The electric vehicle can travel, for example, using either the engine 2010 or the motor 2014 as a drive source. The engine 2010 is a main power source, and examples thereof include a gasoline engine. In the case of using the engine 2010 as a source of power the driving force (for example, torque) of the engine 2010 is transmitted to the front wheels 2022 and the rear wheels 2024 via, for example, the differential device 2015, the transmission 2016, and the clutch 2017, which are driving units. The torque of the engine 2010 is also transmitted to the power generator 2011, the power generator 2011 generates alternating current power utilizing the torque, the alternating current power is converted into direct current power by the inverter 2013, and the direct current power is accumulated in the power source 2003. Meanwhile, in the case of using the motor 2014 which is a converter as a source of power, the electric power (for example, direct current power) supplied from the power source 2003 is converted into alternating current power by the inverter 2012, and the motor 2014 is driven utilizing the alternating current power. The driving force (for example, torque) converted from electric power by the motor 2014 is transmitted to the front wheels 2022 and the rear wheels 2024, for example, via the differential device 2015, the transmission 2016, and the clutch 2017 which are driving units.

It is also permissible that when the electric vehicle is decelerated via a braking mechanism (not shown), the resistance force generated during the deceleration is transmitted to the motor 2014 as a rotational force, and the motor 2014 generates AC power utilizing the rotational force. The AC power is converted into DC power through the inverter 2012, and the DC regenerative power is accumulated in the power source 2003.

The control unit 2001 is a unit that controls the operation of the entire electric vehicle, and includes a CPU, for example. The power source 2003 can include one or two or more magnesium secondary batteries according to the present application (not shown). The power source 2003 also may be configured to be connected to an external power supply and accumulate electric power by receiving power supply from the external power source. The various sensors 2002 are used, for example, to control the rotation speed of the engine 2010 and to control the opening degree (throttle opening degree) of a throttle valve (not shown). The various sensors 2002 include, for example, a speed sensor, an acceleration sensor, and/or an engine speed sensor.

A case where the electrically driven vehicle is a hybrid electric vehicle has been described, but the electrically driven vehicle may be a vehicle (for example, an electric vehicle) which operates using only the power source 2003 and the motor 2014 without using the engine 2010.

Figure 7B:
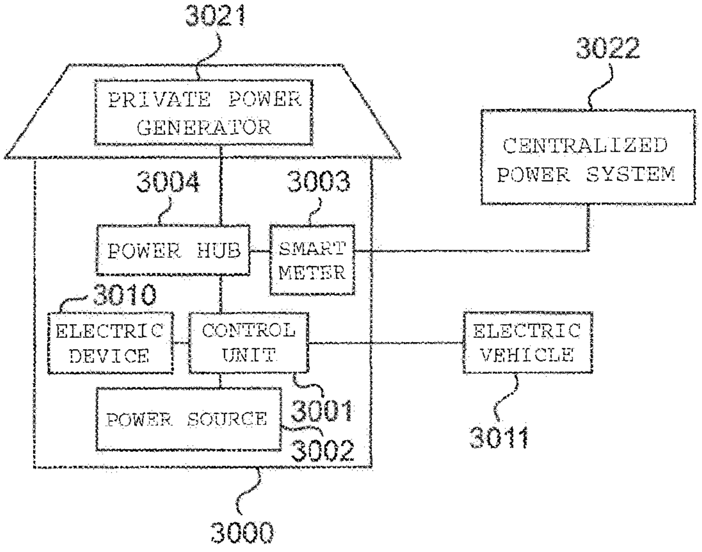

Next, application of the magnesium secondary battery to a power storage system (for example, power supply system) will be described. FIG. 7B shows a block diagram showing a configuration of a power storage system (for example, power supply system). The electric power storage system includes, for example, a control unit 3001, a power source 3002, a smart meter 3003, and a power hub 3004 inside a house 3000 such as a general residence and a commercial building.

For example, the power source 3002 is connected to an electric device (for example, electronic device) 3010 installed in the house 3000 and can be connected to an electrically driven vehicle 3011 which parks outside the house 3000. Further, the power source 3002 is connected to, for example, a private power generator 3021 installed in the house 3000 via the power hub 3004, and can be connected to an external centralized power system 3022 via the smart meter 3003 and the power hub 3004. The electrical device (e.g. electronic device) 3010 includes, for example, one or more home appliances. Examples of home appliances include refrigerators, air conditioners, television receivers, and/or water heaters. The private power generator 3021 includes, for example, a solar power generator and/or a wind power generator. Examples of the electrically driven vehicle 3011 include an electric vehicle, a hybrid vehicle, an electric motorcycle, an electric bicycle, and/or a Segway (registered trademark). Examples of the centralized power systems 3022 can include commercial power supplies, power generators, power grids, and/or smart grids (e.g. next-generation power grids) and, for example, thermal power plants, nuclear power plants, hydropower plants, and/or wind power plants, and examples of power generation devices provided in the centralized power system 3022 include various solar cells, fuel cells, wind power generation devices, and/or micro-hydraulic power generation devices, geothermal power generation devices, and the like can be exemplified, but the present application is not limited to these.

The control unit 3001 is a unit that controls operation of the entire power storage system (including a used state of the power source 3002), and includes a CPU, for example. The power source 3002 can include one or two or more magnesium secondary batteries according to the present application (not shown). The smart meter 3003 is, for example, a network-compatible power meter to be installed in the house 3000 on the power demand side, and can communicate with the power supply side. The smart meter 3003 can efficiently and stably supply energy, for example, by controlling the balance between demand and supply in the house 3000 while communicating with outside.

In such a power storage system, for example, electric power is accumulated in the power source 3002 from the centralized power system 3022 as an external power source via the smart meter 3003 and the power hub 3004, and electric power is accumulated in the power source 3002 from the private power generator 3021 as an independent power source via the power hub 3004. The electric power accumulated in the power source 3002 is supplied to the electrical apparatus (for example, an electronic apparatus) 3010 and the electrically driven vehicle 3011 in accordance with the instruction from the control unit 3001, and thus the electrical apparatus (for example, an electronic apparatus) 3010 can be operated as well as the electrically driven vehicle 3011 can be charged. In other words, the electric power storage system is a system which allows the accumulation and supply of electric power in the house 3000 to be performed using the power source 3002.

The electric power accumulated in the power source 3002 can be arbitrarily used. Therefore, for example, it is possible to accumulate electric power from the centralized power system 3022 to the power source 3002 during the midnight when the electricity charge is low and use the electric power accumulated in the power source 3002 during the daytime when the electricity charge is high.

The power storage system described above may be installed in each house (for example, each household) or may be installed in every plurality of houses (for example, every plurality of households).

Figure 7C:
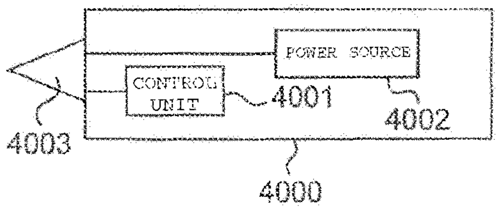

Next, application of the magnesium secondary battery to an electric tool will be described. FIG. 7C shows a block diagram showing a configuration of the electric tool. The power tool is, for example, an electric drill, and includes a control unit 4001 and a power source 4002 inside a tool body 4000 fabricated using a plastic material and the like. For example, a drill unit 4003, which is a moving unit, is attached to the tool body 4000 so as to rotate. The control unit 4001 is a unit that controls the operation of the entire electric tool (including a used state of the power source 4002), and includes a CPU, for example. The power source 4002 can include one or two or more magnesium secondary batteries according to the present application (not shown). The control unit 4001 supplies electric power from the power source 4002 to the drill unit 4003 in response to the operation of an operation switch (not shown).

Although one or embodiments of the present application have been described herein, the present application is not limited to such description.

The composition of the solid electrolyte, the raw materials used for the manufacturing, the manufacturing method, the manufacturing conditions, the characteristics of the solid electrolyte, and the configuration and the structure of the electrochemical device or the battery that have been described above are examples, are not limited to the examples, and can be appropriately changed.

EXAMPLES

Hereinafter, the present application will be described with reference to Examples according to an embodiment.

Example

[1. Synthesis of Mg Polymer Salt]

Mg polymer salt (5-2) was synthesized.

In the synthesis of Mg polymer salt (5-2), the following reagents were used.

- Magnesium chloride $MgCl_2$ (anhydride): manufactured by Sigma-Aldrich Co. LLC.
- Magnesium bistrifluoromethanesulfonylimide (Mg(TFSI)$_2$): manufactured by Tomiyama Pure Chemical Industries, Ltd.
- Dimethoxyethane (DME): manufactured by Tomiyama Pure Chemical Industries, Ltd.
- Potassium 3-(methacryloyloxy)propane-1-sulfonate: manufactured by Sigma-Aldrich Co. LLC., 98%
- Anhydrous tetrahydrofuran (anhydrous THF): manufactured by Sigma-Aldrich Co. LLC., anhydrous, inhibitor-free, ≥99.9%
- Thionyl chloride ($SOCl_2$): manufactured by Nacalai Tesque, Inc., Special Grade, >99%
- Anhydrous dimethylformamide (anhydrous DMF): manufactured by Sigma-Aldrich Co. LLC., anhydrous, 99.8%
- Dichloromethane (DCM): manufactured by Nacalai Tesque, Inc., JIS reagent Special Grade, ≥99.5% (GC)
- Anhydrous magnesium sulfate (anhydrous $MgSO_4$): manufactured by Nacalai Tesque, Inc., Nacalai 1st Grade, ≥99.0% (after ignition)
- Trifluoromethanesulfonamide ($CF_3SO_2NH_2$): manufactured by Tokyo Chemical Industry Co., Ltd., >98.0% (T)
- Anhydrous triethylamine: manufactured by Sigma-Aldrich Co. LLC, ≥99.5%, ≤0.1% (Karl Fischer)
- 4-Methoxyphenol: manufactured by Tokyo Chemical Industry Co., Ltd., 99%
- Lithium hydride (LiH): manufactured by Sigma-Aldrich Co. LLC, powder, −30 mesh, 95%
- Hexane: manufactured by Sigma-Aldrich Co. LLC., ReagentPlus®, ≥99%
- Poly(ethylene oxide) (PEO): manufactured by Sigma-Aldrich Co. LLC, Mw=35000 g/mol
- Anhydrous dichloromethane (DCM): manufactured by Sigma-Aldrich Co. LLC, containing 40 to 150 ppm of amylene as a stabilizer, ≥99.8%
- 4-Cyano-4-(thiobenzylthio)pentanoic acid (CPADB): manufactured by Sigma-Aldrich Co. LLC, >97.0%
- N,N-Dicyclohexylcarbodiimide (DCC): manufactured by Sigma-Aldrich Co. LLC, >99.0%
- 4-(Dimethylamino)pyridine (DMAP): manufactured by Sigma-Aldrich Co. LLC, 99.0%
- Diethyl ether: manufactured by Nacalai Tesque, Inc., JIS reagent Special Grade, 99.5%
- 2,2'-Azobis(2-aminopropane) hydrochloride (AIBA): manufactured by Tokyo Chemical Industry Co., Ltd., >98.0% (HPLC)
- Dialysis membrane: manufactured by Thermo Fisher Scientific Inc., 3500-MWcut-off (MWCO), regenerated cellulose dialysis membrane Mg polymer salt (5-2) was synthesized in accordance with reactions (r-1) to (r-2) as shown in the following reaction scheme.

[Chemical Formula 15]

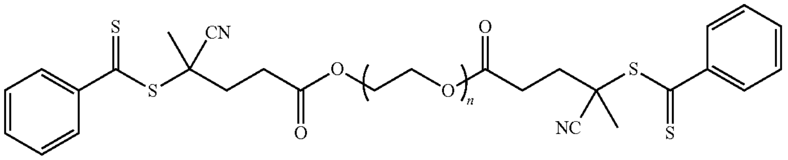

+

(6-2)
PEO macro-chain
transfer agent

-continued

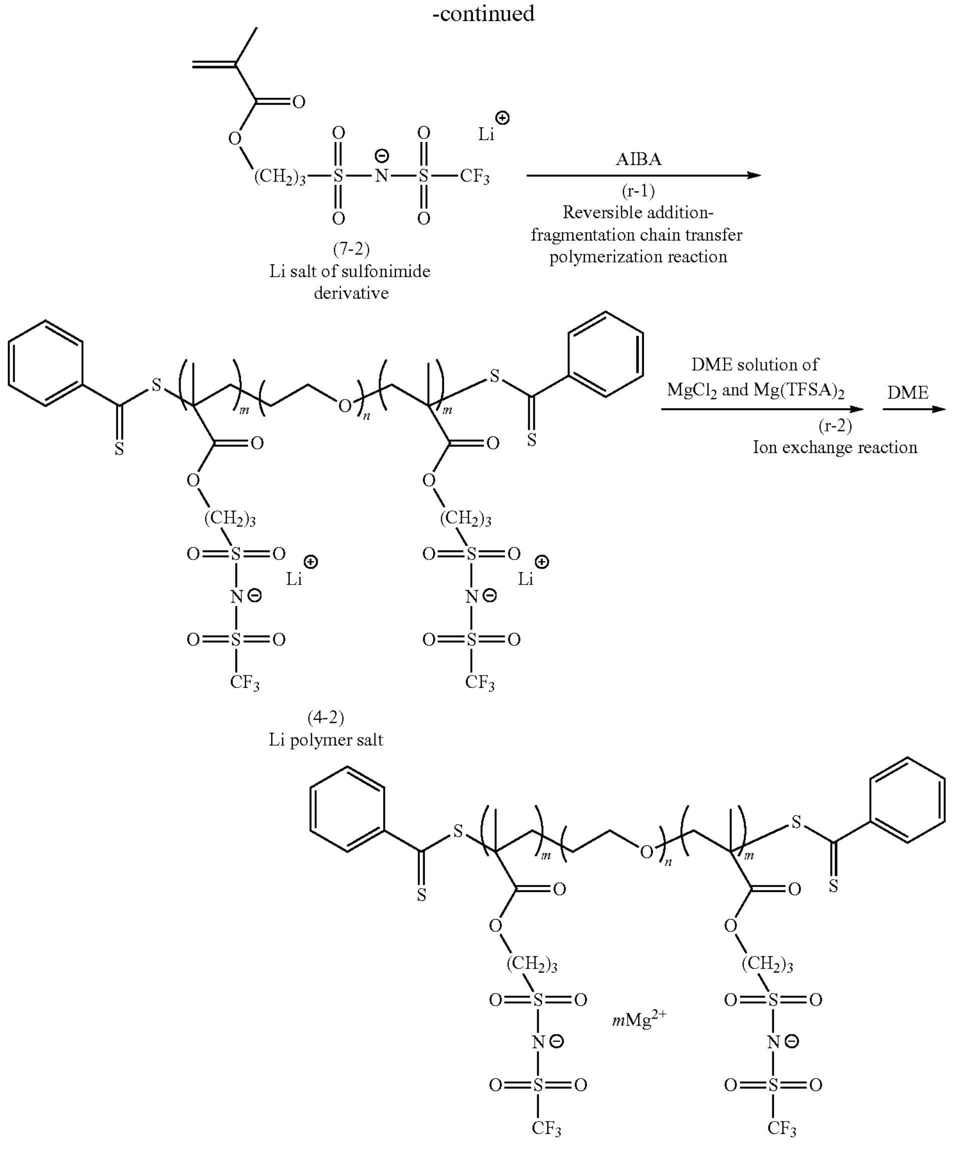

(7-2)
Li salt of sulfonimide derivative (4-2)
Li polymer salt (5-2)
Mg polymer salt In the reaction (r-1), PEO macro-chain transfer agent (6-2) and Li salt (7-2) of a sulfonimide derivative were subjected to a reversible addition-fragmentation chain polymerization reaction in the presence of a polymerization initiator AIBA to synthesize Li polymer salt (4-2). Next, in the reaction (r-2), Mg polymer salt (5-2) was synthesized through an ion exchange reaction of the Li polymer salt (4-2). m and n in the chemical formulas (4-2) and (5-2) represent the degrees of polymerization of the repeating units represented by the chemical formulas (4-2) and (5-2), respectively. m is about 33 to 34 and n is about 794 to 795. n in chemical formula (6-2) has the same meaning as n in chemical formula (5-2). Hereinafter, the synthesis of the Mg polymer salt (5-2) will be described in detail.

[1-1. Synthesis of Li Salt (7-2) of Sulfonimide Derivative]

The Li salt (7-2) of the sulfonimide derivative was synthesized in accordance with reactions (r-3) to (r-5).

[Chemical Formula 16]

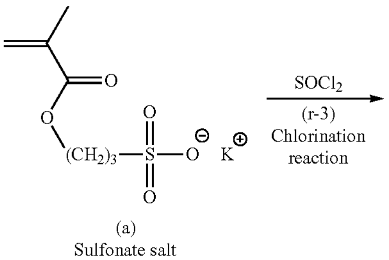

(a)
Sulfonate salt

-continued

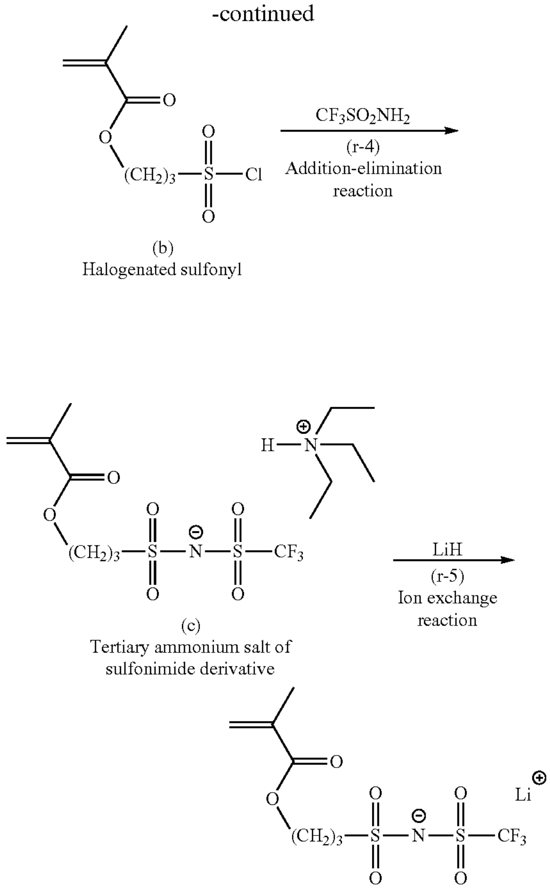

(b)
Halogenated sulfonyl (c)
Tertiary ammonium salt of sulfonimide derivative (d)
Li salt of sulfonimide derivative (Reaction (r-3): Synthesis of 3-(chlorosulfonyl)propyl methacrylate (sulfonyl chloride (b)))

In accordance with the reaction (r-3), sulfonate salt (a) was chlorinated to afford sulfonyl chloride (b).

Specifically, 15.00 g (0.06 mol) of potassium 3-(methacryloyloxy)propane-1-sulfonate was dried under reduced pressure, and added to 25 mL of anhydrous THF under an argon atmosphere to form a suspension. 39.90 g (0.34 mol) of thionyl chloride as a chlorinating agent was dissolved in 1.7 mL of anhydrous DMF to prepare a solution of thionyl chloride in DMF. While the suspension was cooled with ice and stirred with a stirrer, the solution of thionyl chloride in DMF was added dropwise gradually under an argon atmosphere. The mixture was stirred with the stirrer at 0° C. for 1 hour and further at room temperature (for example, 25° C.) for 15 hours. Thereafter, the mixture was gradually added to 200 mL of cold water. 80 mL of dichloromethane was added, and the mixture was washed 6 times with 25 mL of distilled water, and then the dichloromethane phase was dried over anhydrous $MgSO_4$. The dichloromethane phase was filtered and the desiccant was collected by the filtration and removed. The filtrate was dried under reduced pressure using an evaporator, so that dichloromethane was distilled off and a residue was obtained. Thereafter, the residue was dried under reduced pressure overnight to afford sulfonyl chloride (b).

(Reaction (r-4): Synthesis of triethylammonium-1-[3-(methacryloyloxy)propylsulfonyl]-1-(trifluoromethane-sulfonyl)imide) (tertiary ammonium salt (c) of sulfonimide derivative)

In accordance with the reaction (r-4), the sulfonyl chloride (b) was subjected to an addition-elimination reaction with trifluoromethanesulfonamide as a nucleophile to afford tertiary ammonium salt (c) of a sulfonimide derivative.

Specifically, while 7.30 g (0.05 mol) of trifluoromethanesulfonamide was stirred with a stirrer under an argon atmosphere, 10.90 g (0.11 mol) of anhydrous triethylamine was slowly added. Thereafter, 40 mL of anhydrous THF was further added. As a result, a solution was obtained.

11.10 g (0.05 mol) of sulfonyl chloride (b) was mixed with 15 mL (13.50 g) of anhydrous THF to prepare a solution of sulfonyl chloride (b) in THF. While that solution was cooled with ice and stirred with a stirrer, the solution of sulfonyl chloride (b) in THF was slowly added dropwise to that solution. Thereafter, the mixture was stirred with the stirrer at 0° C. for 1 hour, then returned to room temperature, and stirred with the stirrer at room temperature for 1 hour. As a result, a precipitate was obtained.

The precipitate was filtered with suction under an argon atmosphere. Thereafter, the filtrate was dried under reduced pressure using an evaporator. 90 mL of dichloromethane was added and washed 4 times with 35 mL of distilled water, and the dichloromethane phase was dried over anhydrous $MgSO_4$. The dichloromethane phase was filtered and the desiccant was collected by the filtration and removed. A small amount of 4-methoxyphenol was added to the filtrate, and then dichloromethane in the filtrate was distilled off using an evaporator to afford a residue. Thereafter, the residue was dried under reduced pressure to afford tertiary ammonium salt (c) of a sulfonimide derivative.

(Reaction (r-5): Synthesis of lithium 1-[3-(methacryloyloxy)propylsulfonyl]-1-(trifluoromethane-sulfonyl)imide) (Li salt (7-2) of sulfonimide derivative)

In the reaction (r-5), Li salt (7-2) of a sulfonimide derivative was obtained through an ion exchange reaction of the tertiary ammonium salt (c) of the sulfonimide derivative.

Specifically, while 9 mL of anhydrous THF was stirred with a stirrer under an argon atmosphere, 5.89 g (13.36 mmol) of the tertiary ammonium salt (c) of the sulfonimide derivative was added. Thereafter, 0.26 g (34.06 mmol) of LiH was further gradually added. The mixture was stirred with the stirrer under an argon atmosphere overnight. Thereafter, the mixture was filtered, and the filtrate was concentrated under reduced pressure with an evaporator to afford a residue. The residue was washed 4 times with 10 mL of hexane. Thereafter, the residue was further dried under reduced pressure. To the residue was added 25 mL of anhydrous dichloromethane, and the resulting mixture was stored in a refrigerator (10° C.) overnight to form a precipitate. The precipitate was filtered and dried under reduced pressure to afford Li salt (7-2) of the sulfonimide derivative.

[1-2. Synthesis of PEO Macro-Chain Transfer Agent]

In accordance with the reaction (r-6), CPADB and PEO were subjected to a Steglich esterification reaction to afford PEO macro-chain transfer agent (6-2).

[Chemical Formula 17]

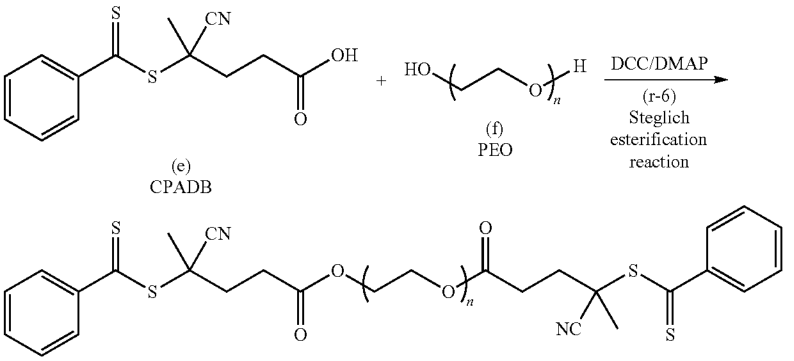

(e)
CPADB (f)
PEO (6-2)
PEO macro-chain
transfer agent

Specifically, 15.0 g of PEO was distilled with 30 mL of toluene for 2 hours. Thereafter, drying under reduced pressure was carried out at 55° C. for 12 hours. 10.00 g (0.29 mmol) of PEO was dissolved in 100 mL of anhydrous dichloromethane (DCM) to prepare a solution of PEO in DCM. 0.95 g (3.42 mmol) of 4-cyano-4-(thiobenzoylthio) pentanoic acid (CPADB) was dispersed in 0.77 g (3.76 mmol) of N,N-dicyclohexylcarbodiimide (DCC) as a condensing agent to prepare a dispersion. While the solution of PEO in DCM was stirred with a stirrer at 0° C., the dispersion was slowly added dropwise to the solution of PEO in DCM.

0.13 g (1.06 mmol) of 4-(dimethylamino)pyridine (DMAP) as a catalyst was dissolved in 2 mL of anhydrous DCM to prepare a solution of DMAP in DCM. The solution of DMAP in DCM was further added dropwise to the solution of PEO in DCM, and the mixture was stirred with the stirrer at 0° C. for 48 hours. Thereafter, the solid was collected by filtration and washed with 50 mL of DCM. 500 mL of ice-cooled diethyl ether was added to the filtrate to precipitate a polymer, and the polymer was centrifuged. An operation of adding 30 mL of DCM to the separated polymer to dissolve the polymer followed by centrifuging the solution with 100 mL of ice-cold diethyl ether was repeated 2 times. The resulting mixture was dried under reduced pressure at room temperature for 3 hours to afford PEO macro-chain transfer agent (macro-CTA) (6-2).

[1-3. Synthesis of Li Polymer Salt (4-2)]

In accordance with the reaction (r-1), the PEO macro-chain transfer agent (6-2) and the Li salt (d) of the sulfonimide derivative were subjected to a reversible addition-fragmentation chain polymerization reaction to afford Li polymer salt (4-2).

Specifically, 0.70 g (20 μmoL) of the PEO macro-chain transfer agent (6-2) and 0.47 g (1.35 mmol) of the Li salt (d) of the sulfonimide derivative were dissolved in 4.7 mL of ion-exchanged water to prepare a solution. 1.09 mg (4.02 μmoL) of AIBA as a polymerization initiator was added to the obtained solution and dissolved. After replacement with argon, the solution was immersed in an oil bath heated to 65° C. and heated for 11 hours. The temperature was returned to room temperature, and dialysis (MWCO 3500) was carried out with distilled water for 3 days. The mixture was dialyzed, freeze-dried, and dried at 80° C. under reduced pressure for 24 hours to afford Li polymer salt (4-2).

[1-4. Synthesis of Mg Polymer Salt (5-2)]

In accordance with the reaction (r-2), Mg polymer salt (5-2) was synthesized. In the reaction (r-2), Mg polymer salt (5-2) was obtained through an ion exchange reaction of the Li polymer salt (4-2).

Specifically, the Li polymer salt (4-2) (thickness t=100 μm, 0.05 g) formed into a sheet and dried under reduced pressure was dissolved in 2 mL of a Mg electrolytic solution ((2M $MgCl_2$+1M Mg $(TFSI)_2$)/DME) under an argon atmosphere. 38 mL of DME was further added to precipitate Mg polymer salt (5-2). The supernatant was removed, and the solid was washed twice with 20 mL of DME. Thereafter, the solid was naturally dried under an argon atmosphere. Thereafter, the solid was dried under reduced pressure (room temperature, 1 hour) and heat-pressed to form a sheet.

[1-5. Identification]

$^1$NMR spectra of the obtained Li polymer salt (4-2) and Mg polymer salt (5-2) were measured. In the measurement of the $^1$NMR spectra, $CDCl_3$ was used as a solvent. Tetramethylsilane (TMS) was used as an internal standard sample.

Figure 9:
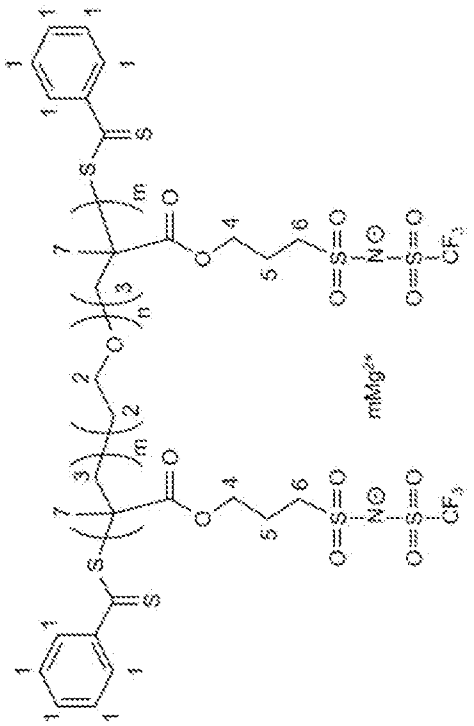
FIG. 9 is a graph (NMR spectrum) showing the result of "Evaluation of identification" in [Example] in the present description.
Figure 9:
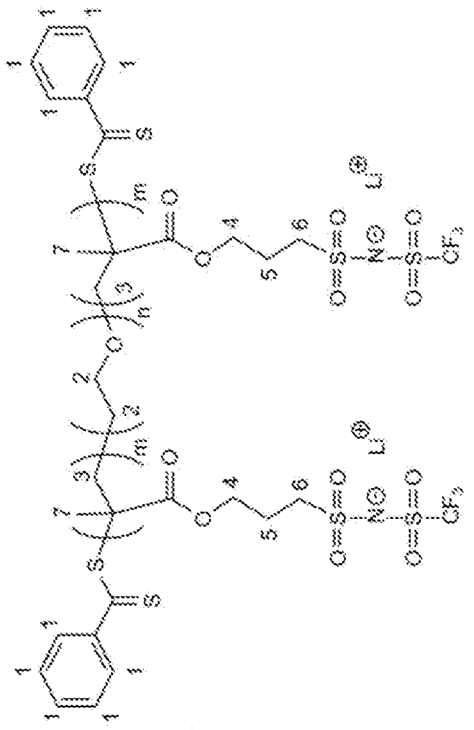
Figure 9:
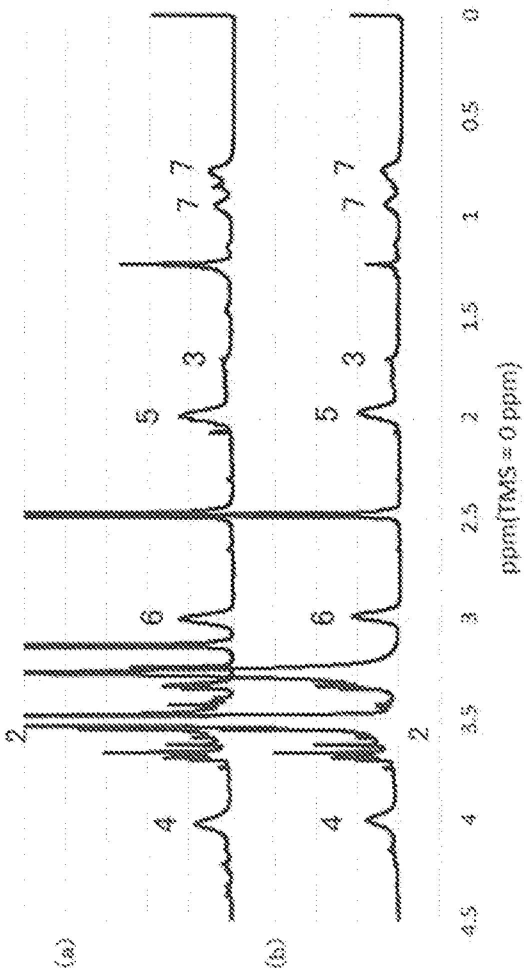

FIG. 9(*a*) shows the $^1$NMR spectrum of the Mg polymer salt (5-2), and FIG. 9(*b*) shows the $^1$NMR spectrum of the Li polymer salt (4-2). The chemical structural formulas of these polymer salts are also shown. In FIG. 9(*b*), each peak of the $^1$NMR spectrum was assigned to hydrogen atoms of the Li polymer salt (4-2). The numerical values of the respective peaks of the $^1$NMR spectrum and the numerical values in the chemical structural formula indicate a correspondence relationship. As a result, it was confirmed that the intended Li polymer salt (4-2) was successfully synthesized. In FIG. 9(*a*), similarly, the respective peaks of the $^1$NMR spectrum were assigned to hydrogen atoms of the Mg polymer salt (5-2). Furthermore, since the $^1$NMR spectrum in FIG. 9(*a*) has substantially the same shape as the $^1$NMR spectrum in FIG. 9(*b*), it was confirmed that there is no structural change in the counter anion (anionic polymer) when $Li^+$ is replaced by $Mg^{2+}$ through the ion exchange reaction.

(Measurement of Number Average Molecular Weight Mn)

The number average molecular weight Mn of the Mg polymer salt (5-2) was measured by gel permeation chromatography. As measurement conditions, a solution of 0.1 M $MgCl_2$-1.5×$10^{-5}$ M $NaN^3$ was used as an eluent, and a mixed solvent of water/acetonitrile (4/1=v/v) was used as the solvent of the solution. The flow rate of the eluent was 0.5 mL/min at 35° C. Pullulan standards were used for calibration.

[2. Preparation of Polymer Solid Electrolyte and Magnesium-Sulfur Secondary Battery]

A polymer solid electrolyte and a magnesium-sulfur secondary battery including the electrolyte were prepared. The specifications of the polymer solid electrolyte and the magnesium-sulfur secondary battery are as follows.

(Specification of Polymer Solid Electrolyte)

Mg polymer salt (5-2) (φ 5 mm, thickness t 100 μm) (Specifications of magnesium-sulfur secondary battery)

Negative electrode: magnesium electrode (Mg plate with φ15 mm and thickness of 200 μm/purity: 99.9%)

Positive electrode: sulfur electrode (electrode having 10 mass % of $S_8$ sulfur, containing Ketjen black (KB) as conductive assistant, and containing polytetrafluoroethylene (PTFE) as binder)

Separator: glass fibers

Polymer solid electrolyte: Mg polymer salt (5-2) (φ 5 mm)

Secondary battery form: coin battery CR2016 type

Figure 8:
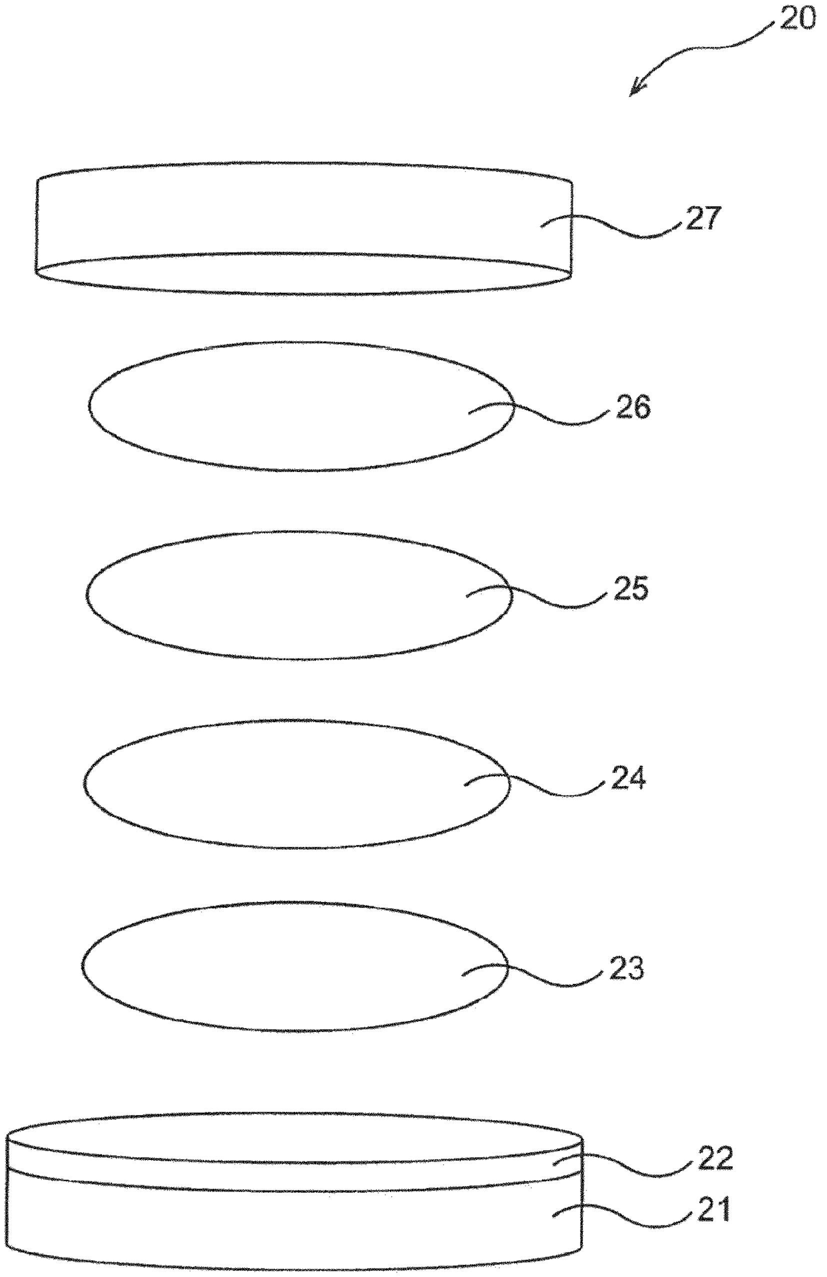
FIG. 8 is a developed view schematically illustrating a battery produced in [Example] of the present description.

FIG. 8 shows a schematic developed view of the battery produced. Regarding the positive electrode 23, 10% by mass of sulfur ($S_8$), 60% by mass of Ketjen black as a conductive aid, and 30% by mass of polytetrafluoroethylene (PTFE) as a binder were mixed using an agate mortar. Then, the resulting mixture was rolled about 10 times using a roller compactor while being softened with acetone. Thereafter, the resultant was dried by vacuum drying at 70° C. for 12 hours. Thus, the positive electrode 23 was successfully obtained.

A gasket 22 was placed on a coin battery can 21, on which a positive electrode 23 made of sulfur, a separator 24 made of glass fiber, a negative electrode 25 made of a Mg plate having a diameter of 15 mm and a thickness of 200 μm, a spacer 26 made of a stainless steel plate having a thickness of 0.5 mm, and a coin battery lid 27 were stacked in this order, and then sealed by crimping the coin battery can 21. The spacer 26 was spot-welded to the coin battery lid 27 in advance.

[3. Electrochemical Measurement]

(Impedance Measurement)

The battery prepared above was used as an evaluation cell. The evaluation cell was placed in a thermostatic chamber, and the impedance was measured under the following measurement conditions. The measurement was carried out using a potentiostat (VMP3 manufactured by Bio-Logic) 3 hours after the thermostatic bath reached each set temperature.

Measurement Conditions

Frequency: 1 MHz to 1 Hz

Amplitude: 10 mV

Temperature range: 25° C., 30° C. to 50° C. (10° C. increments)

Figure 10:
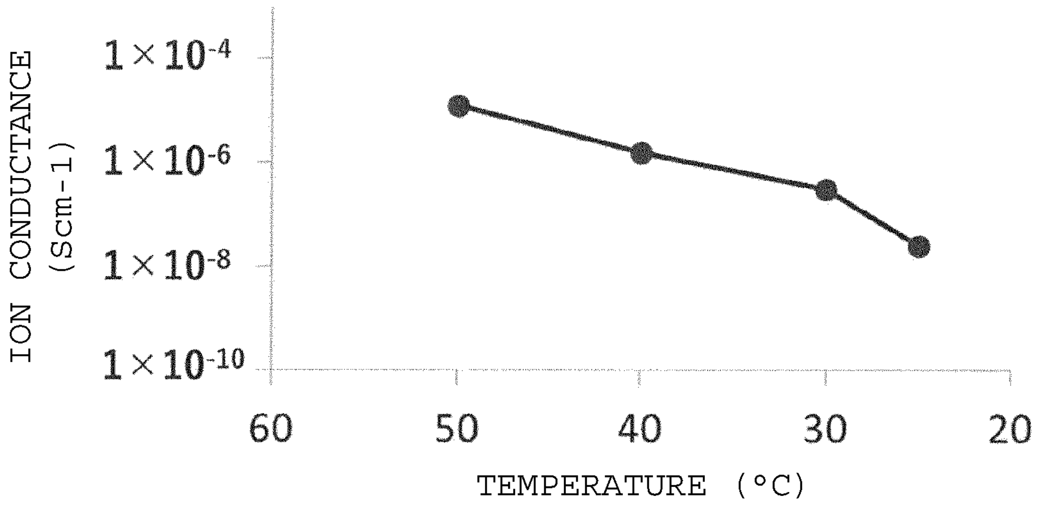
FIG. 10 is a graph showing the result of "Evaluation of ion conductivity" in [Example] in the present description (in particular, a graph showing a relationship between ion conductance and temperature).

The electrical resistance (unit: Ω) and ion conductance (Mg ion conductance) obtained at each temperature are shown in Table 1 and FIG. 10.

TABLE 1

| Temperature (° C.) | Electrical resistance (Ω) | Ion conductance σ (S/cm) |
|---|---|---|
| 25 | $2.0 \times 10^6$ | $2.6 \times 10^{-8}$ |
| 30 | $1.7 \times 10^5$ | $3.1 \times 10^{-7}$ |
| 40 | $3.3 \times 10^4$ | $1.5 \times 10^{-6}$ |
| 50 | $4.0 \times 1^3$ | $1.3 \times 10^{-5}$ |

The polymer solid electrolyte containing the Mg polymer salt (5-2) had a Mg ion conductance of $1.3\times10^{-5}$ S/cm at 50° C. at 50° C. In addition, it was confirmed that the Mg ion conductance increased with an increase in temperature (temperature dependency). On the other hand, the inorganic solid electrolytes described in Patent Documents 1 and 2 as comparative examples had an ion conductance of $1.1\times10^{-9}$ to about $3.6\times10^{-6}$ S/cm at 500° C. Since inorganic solid electrolytes also have the temperature dependency of ion conductance similarly to the polymer solid electrolytes described above, the ion conductance at 50° C. is expected to be much smaller than the ion conductance at 500° C. Therefore, it was found that the polymer solid electrolyte of Example had an ion conductance at least 1 to 3 orders of magnitude higher than that of the inorganic solid electrolytes of comparative examples.

Summarizing the above, the following items were enabled be found from this verification test.

The polymer solid electrolyte of the Example contains Mg polymer salt (5-2). Since the Mg polymer salt (5-2) is a Mg polymer salt including $Mg^{2+}$ and an anionic polymer having an anionic functional group and a coordinating functional group, inclusion of a Mg polymer salt having such a composition and structure can contribute to high Mg ion conductivity.

Since the Mg polymer salt (5-2) contained in the polymer solid electrolyte of the Example has a coordinating substituent in the main chain, inclusion of a Mg polymer salt having such a structure can contribute to high Mg ion conductivity.

Since the Mg polymer salt (5-2) contained in the polymer solid electrolyte of the Example has poly(alkylene oxide) (more specifically, poly(ethylene oxide)) as a coordinating substituent in the main chain, inclusion of a Mg polymer salt having such a structure can contribute to high Mg ion conductivity.

Since the Mg polymer salt (5-2) contained in the polymer solid electrolyte of the Example has an anionic functional group (especially, a trifluoromethylsulfonylamide group) in a side chain, inclusion of a Mg polymer salt having such a structure can contribute to high Mg ion conductivity.

Since the polymer solid electrolyte of the Example contains a Mg polymer salt, the polymer solid electrolyte has flexibility and can contribute to structure maintainability.

The polymer solid electrolyte of the present application can be used in various fields for extracting energy by utilizing an electrochemical reaction. Although it is merely an example, the polymer solid electrolyte of the present application is used not only for secondary batteries but also for various electrochemical devices such as capacitors, air batteries and fuel cells.

DESCRIPTION OF REFERENCE SYMBOLS

10: Positive electrode
11: Negative electrode
12: Electrolyte layer

31: Positive electrode
32: Negative electrode
33: Separator
35, 36: Current collector
37: Gasket
41: Porous positive electrode
42: Negative electrode
43: Separator and solid electrolyte
44: Air electrode side current collector
45: Negative electrode side current collector
46: Diffusion layer
47: Oxygen-selective permeable film
48: Exterior body
51: Air (atmosphere)
52: Oxygen
61: Positive electrode
62: Positive electrode solid electrolyte
63: Positive electrode solid electrolyte transport pump
64: Fuel flow path
65: Positive electrode solid electrolyte storage container
71: Negative electrode
72: Negative electrode solid electrolyte
73: Negative electrode solid electrolyte transport pump
74: Fuel flow path
75: Negative electrode solid electrolyte storage container
66: Ion exchange membrane
100: Magnesium secondary battery
111: Electrode structure housing member (battery can)
112, 113: Insulating plate
114: Battery lid
115: Safety valve mechanism
115A: Disk plate
116: Positive temperature coefficient element (PTC element)
117: Gasket
118: Center pin
121: Electrode structure
122: Positive electrode
123: Positive electrode lead portion
124: Negative electrode
125: Negative electrode lead portion
126: Separator
200: Exterior member
201: Close contact film
221: Electrode structure
223: Positive electrode lead portion
225: Negative electrode lead portion
1001: Cell (assembled battery)
1002: Magnesium secondary battery
1010: Control unit
1011: Memory
1012: Voltage measurement unit
1013: Current measurement unit
1014: Current detection resistor
1015: Temperature measurement unit
1016: Temperature detection element
1020: Switch control unit
1021: Switch unit
1022: Charge control switch
1024: Discharge control switch
1023, 1025: Diode
1031: Positive electrode terminal
1032: Negative electrode terminal
CO, DO: Control signal
2000: Housing
2001: Control unit
2002: Various sensors
2003: Power source
2010: Engine
2011: Power generator
2012, 2013: Inverter
2014: Driving motor
2015: Differential device
2016: Transmission
2017: Clutch
2021: Front wheel drive shaft
2022: Front wheel
2023: Rear wheel drive shaft
2024: Rear wheel
3000: House
3001: Control unit
3002: Power source
3003: Smart meter
3004: Power hub
3010: Electric device (electronic device)
3011: Electric vehicle
3021: Private power generator
3022: Centralized power system
4000: Tool body
4001: Control unit
4002: Power source
4003: Drill unit It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for producing a polymer solid electrolyte having Mg ion conductivity, the method comprising dissolving a Li polymer salt represented by general formula (4):

(4)

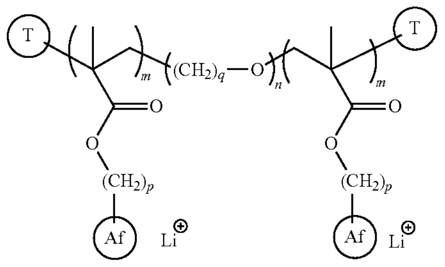

in the general formula (4), Af represents an anionic functional group, T represents a terminal group, m represents an integer of 3 to 40, n represents an integer of 150 to 850, p and q each represent an integer of 1 to 10, and p and q may be same or different from each other, in a linear ether solution of a Mg salts; and adding a linear ether to precipitate a Mg polymer salt represented by general formula (5):

(5)

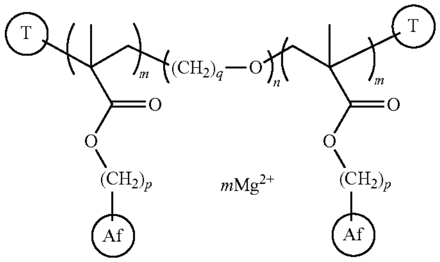

in the general formula (5), Af represents an anionic functional group, T represents a terminal group, m represents an integer of 3 to 40, n represents an integer of 150 to 850, p and q each represent an integer of 1 to 10, and p and q may be same or different from each other.

2. The method for producing a polymer solid electrolyte according to claim 1, wherein in the general formulas (4) and (5), the anionic functional group is a trifluoromethylsulfonylamide group.

3. The method for producing a polymer solid electrolyte according to claim 1, wherein in the general formulas (4) and (5), q represents 2.

* * * * *